(12) United States Patent
Kumar et al.

(10) Patent No.: US 11,408,571 B2
(45) Date of Patent: Aug. 9, 2022

(54) CONFIGURABLE MODES FOR LIGHTING SYSTEMS

(71) Applicant: SIGNIFY HOLDING B.V., Eindhoven (NL)

(72) Inventors: Jyoti Kumar, Tyrone, GA (US); Steven Walter Pyshos, Peachtree City, GA (US); Raymond Janik, Fayetteville, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 109 days.

(21) Appl. No.: 16/921,040

(22) Filed: Jul. 6, 2020

(65) Prior Publication Data

US 2020/0335049 A1 Oct. 22, 2020

Related U.S. Application Data

(63) Continuation of application No. 16/392,422, filed on Apr. 23, 2019, now Pat. No. 10,733,944, which is a
(Continued)

(51) Int. Cl.
*H05B 45/20* (2020.01)
*F21V 7/00* (2006.01)
(Continued)

(52) U.S. Cl.
CPC .............. *F21S 8/026* (2013.01); *F21S 8/04* (2013.01); *F21V 21/14* (2013.01); *F21V 23/04* (2013.01);
(Continued)

(58) Field of Classification Search
CPC ........ H05B 45/00; H05B 45/20; H05B 45/24; H05B 47/10; H05B 47/11; H05B 47/155;
(Continued)

(56) References Cited

U.S. PATENT DOCUMENTS 6,149,283 A 11/2000 Conway et al.
6,201,351 B1 3/2001 Rudolph et al.
(Continued)

FOREIGN PATENT DOCUMENTS

CN 201844227 U 5/2011
EP 0022568 A1 * 1/1981 ......... G01N 15/1245

OTHER PUBLICATIONS

International Search Report for PCT/US2018/047718, dated Nov. 29, 2018.
(Continued)

*Primary Examiner* — Jimmy T Vu

(57) ABSTRACT

A luminaire can include an antenna and a first communication mode that is configured to communicate with an external system. The luminaire can also include a second communication mode that is configured to communicate with the external system. The luminaire can further include a switch coupled to the antenna, the first communication mode, and the second communication mode, where switch has a first position and a second position, where the switch, when in the first position, couples the first communication mode with the antenna, and where the switch, when in the second position, couples the second communication mode with the antenna.

20 Claims, 19 Drawing Sheets

Related U.S. Application Data continuation of application No. 16/142,605, filed on Sep. 26, 2018, now Pat. No. 10,290,265, which is a continuation-in-part of application No. 15/892,192, filed on Feb. 8, 2018, now Pat. No. 10,163,405, which is a continuation of application No. 15/685,358, filed on Aug. 24, 2017, now Pat. No. 9,892,693, which is a continuation-in-part of application No. 15/435,141, filed on Feb. 16, 2017, now Pat. No. 9,820,350.

(60) Provisional application No. 62/563,418, filed on Sep. 26, 2017, provisional application No. 62/297,424, filed on Feb. 19, 2016.

(51) Int. Cl.

| | | |
|---|---|---|
| *F21V 23/04* | (2006.01) | |
| *F21S 8/02* | (2006.01) | |
| *G09G 3/34* | (2006.01) | |
| *F21S 8/04* | (2006.01) | |
| *F21V 21/14* | (2006.01) | |
| *H05B 45/24* | (2020.01) | |
| *H05B 47/11* | (2020.01) | |
| *H05B 47/19* | (2020.01) | |
| *F21V 5/00* | (2018.01) | |
| *F21Y 115/10* | (2016.01) | |
| *F21V 23/06* | (2006.01) | |
| *F21Y 105/18* | (2016.01) | |

(52) U.S. Cl.
CPC ........... *G09G 3/3413* (2013.01); *H05B 45/20* (2020.01); *H05B 45/24* (2020.01); *H05B 47/11* (2020.01); *H05B 47/19* (2020.01); *F21V 5/00* (2013.01); *F21V 7/00* (2013.01); *F21V 23/06* (2013.01); *F21Y 2105/18* (2016.08); *F21Y 2115/10* (2016.08)

(58) Field of Classification Search
CPC .. H05B 47/19; F21S 8/026; F21S 8/04; F21V 21/14; F21V 23/04; F21V 5/00; F21V 7/00; F21V 23/06; F21Y 2115/10; G09G 3/3413
See application file for complete search history.

(56) References Cited

U.S. PATENT DOCUMENTS

| | | | |
|---|---|---|---|
| 7,014,336 B1 | 3/2006 | Ducharme et al. | |
| 7,255,457 B2 | 8/2007 | Ducharme et al. | |
| 7,416,312 B1 | 8/2008 | McDermott | |
| 7,926,300 B2 | 4/2011 | Roberts et al. | |
| 8,172,415 B2 | 5/2012 | Wegh et al. | |
| 8,177,390 B2 | 5/2012 | Miskin | |
| 8,317,362 B2 | 11/2012 | Ku et al. | |
| 8,598,793 B2 | 12/2013 | Yan et al. | |
| 8,872,438 B2 | 10/2014 | Zhou et al. | |
| 8,941,312 B2 | 1/2015 | McRae | |
| 8,947,013 B2 | 2/2015 | Sutardja et al. | |
| 9,072,148 B2 | 6/2015 | Tanaka et al. | |
| 9,144,129 B2 | 9/2015 | Munday et al. | |
| 9,247,597 B2 | 1/2016 | Miskin et al. | |
| 9,820,350 B2 | 11/2017 | Pyshos et al. | |
| 9,892,693 B1 | 2/2018 | Kumar et al. | |
| 10,091,855 B2 | 10/2018 | Van Winkle | |
| 10,136,503 B2 | 11/2018 | Chen | |
| 10,163,405 B2 | 12/2018 | Kumar et al. | |
| 10,290,265 B2 | 5/2019 | Kumar et al. | |
| 10,299,335 B2 | 5/2019 | Pyshos et al. | |
| 10,299,336 B2 | 5/2019 | Bowen et al. | |
| 2005/0077837 A1 | 4/2005 | Kim et al. | |
| 2006/0220586 A1 | 10/2006 | Latham | |
| 2008/0060917 A1 | 3/2008 | Chia-Li et al. | |
| 2010/0237798 A1 | 9/2010 | Wolf et al. | |
| 2013/0009616 A1* | 1/2013 | Chang | H05B 39/044 323/241 |
| 2013/0114241 A1 | 5/2013 | van de Ven et al. | |
| 2013/0328503 A1 | 12/2013 | Toda | |
| 2014/0210357 A1 | 7/2014 | Yan et al. | |
| 2014/0210376 A1 | 7/2014 | Hicks, IV | |
| 2014/0301073 A1 | 10/2014 | Miskin | |
| 2014/0301074 A1 | 10/2014 | Miskin | |
| 2015/0054410 A1 | 2/2015 | Sanders et al. | |
| 2017/0019973 A1 | 1/2017 | Beck et al. | |
| 2017/0086265 A1 | 3/2017 | Akiyama et al. | |
| 2017/0105265 A1 | 4/2017 | Sadwick | |

OTHER PUBLICATIONS

Test Report of California Appliance Efficiency Compliance for Permanently Installed High Efficacy Leds Under Title 24, Issued Nov. 18, 2015.

Energy Star, Certificate of Compliance, Certificate No. 1129756, Issued Nov. 25, 2015.

Test Report of IES LM-79-08; Approved Method: Electrical and Photmetric Measurements of Solid-State Lighting Products; Issued Nov. 18, 2015.

* cited by examiner

CONFIGURABLE MODES FOR LIGHTING SYSTEMS

CROSS REFERENCE TO RELATED APPLICATIONS

This application is a continuation application of and claims priority under 35 U.S.C. § 120 to U.S. patent application Ser. No. 16/392,422, titled "Configurable Modes For Lighting Systems" and filed on Apr. 23, 2019, which is a continuation application of and claims priority under 35 U.S.C. § 120 to U.S. patent application Ser. No. 16/142,605, titled "Configurable Modes For Lighting Systems" and filed on Sep. 26, 2018, which claims priority to U.S. Provisional Patent Application Ser. No. 62/563,418, titled "Configurable Communication Modes For Lighting Systems" and filed on Sep. 26, 2017. Application Ser. No. 16/142,605 also is a continuation-in-part of and claims priority to U.S. patent application Ser. No. 15/892,192, titled "Configurable Lighting System" and filed on Feb. 8, 2018, which is a continuation application of and claims priority under 35 U.S.C. § 120 to U.S. patent application Ser. No. 15/685,358, titled "Configurable Lighting System" and filed on Aug. 24, 2017, which is a continuation-in-part of and claims priority to U.S. patent application Ser. No. 15/435,141, titled "Configurable Lighting System" and filed on Feb. 16, 2017, which claims priority to U.S. Provisional Patent Application No. 62/297,424 filed Feb. 19, 2016, in the name of Steven Walter Pyshos and Raymond Janik and entitled "Configurable Lighting System". The entire contents of these aforementioned applications are hereby incorporated herein by reference.

TECHNICAL FIELD

Embodiments of the technology relate generally to lighting systems and more specifically to lighting systems that can be readily configured to utilize multiple communication and/or other modes of operation.

BACKGROUND

Different communication modes can be used for communication involving luminaires. For example, Zigbee can be used to communicate with a luminaire. As another example, Bluetooth can be used to communicate with another luminaire. Communication with a luminaire can be used for any of a number of purposes, such as providing operating instructions to the luminaire (or components thereof) and obtaining data from the luminaire.

SUMMARY

In general, in one aspect, the disclosure relates to a luminaire that includes an antenna and a first communication mode that is configured to communicate with an external system. The luminaire can also include a second communication mode that is configured to communicate with the external system. The luminaire can further include a switch coupled to the antenna, the first communication mode, and the second communication mode, where switch has a first position and a second position, where the switch, when in the first position, couples the first communication mode with the antenna, and where the switch, when in the second position, couples the second communication mode with the antenna.

In another aspect, the disclosure can generally relate to a switch for controlling a communication protocol of a luminaire. The switch can include a body and at least one first coupling feature disposed on a bottom end of the body, where the at least one first coupling feature is configured to electrically couple to an electrical connector of the luminaire. The switch can also include an actuator that has a first position and a second position relative to the body. The first position of the actuator can correspond to a first communication protocol of the luminaire, and the second position of the actuator can correspond to a second communication protocol of the luminaire.

In general, in one aspect, the disclosure relates to a luminaire that includes a housing and a lens removably coupled to the housing. The luminaire can also include a first light source having a first color temperature, and a second light source having a second color temperature. The luminaire can further include a switch coupled to the housing, the first light source, and the second light source, where the switch is accessible when the lens is decoupled from the housing, where the switch is inaccessible when the lens is coupled to the housing. The switch can have a first position and a second position, where the switch, when in the first position, provides power to the first light source, and where the switch, when in the second position, provides power to the second light source.

These and other aspects, objects, features, and embodiments will be apparent from the following description and the appended claims.

BRIEF DESCRIPTION OF THE DRAWINGS

The drawings illustrate only example embodiments of modular light fixture frames and housings and are therefore not to be considered limiting of its scope, as modular light fixture frames and housings may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

Figure 1A:
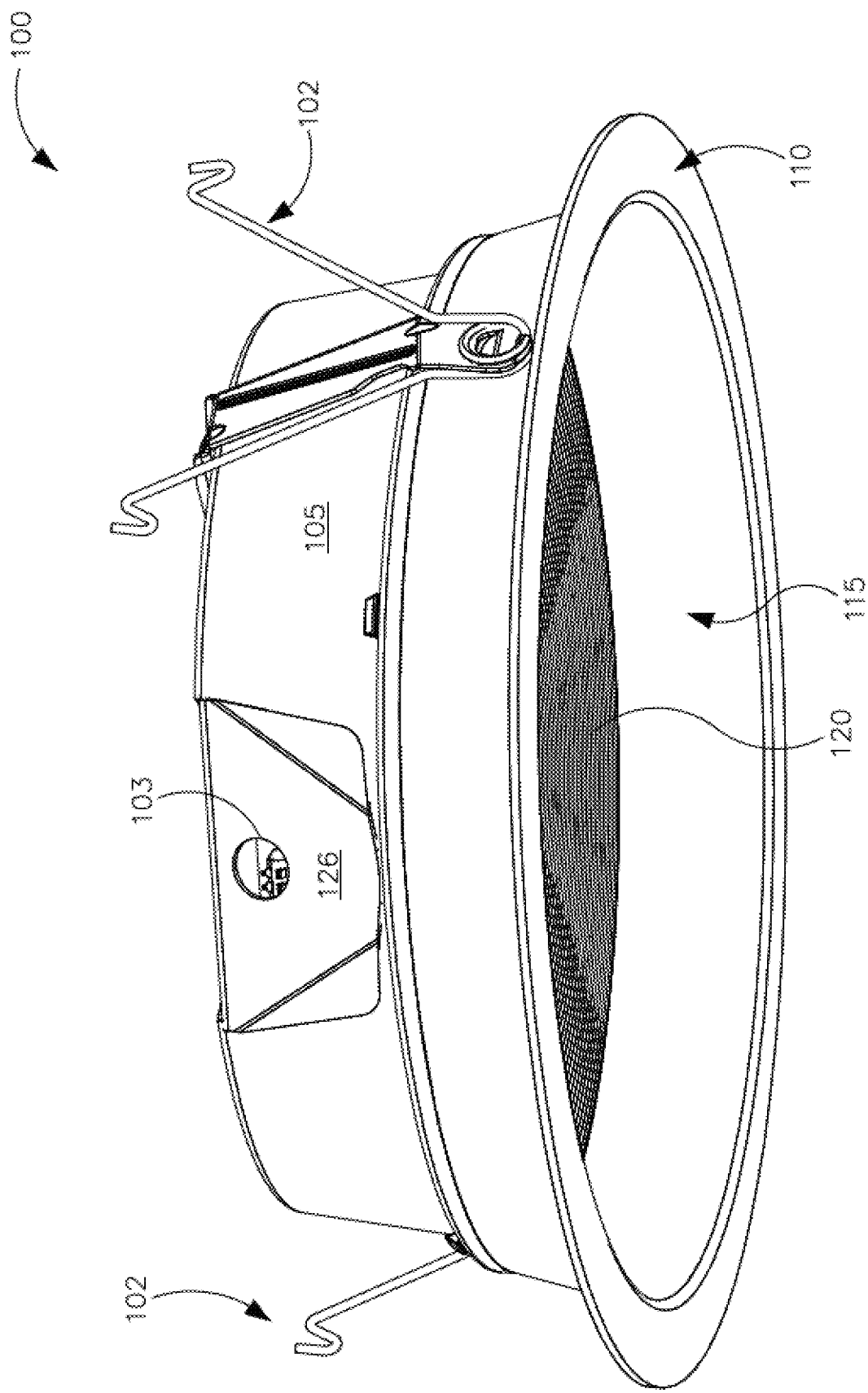
FIGS. 1A, 1B, 1C, 1D, 1E, 1F, 1G, 1H, 1I, 1J, and 1K (collectively FIG. 1) illustrate views of a luminaire that includes a switch in accordance with certain example embodiments.

In some example embodiments of the disclosure, a luminaire can comprise multiple communication modes. The power supply can utilize a switching scheme that can select one of multiple communication modes used by a luminaire. In addition, or in the alternative, the power supply can utilize a switching scheme that can select one of multiple output levels (e.g., correlated color temperature (CCT)) of a luminaire.

In some example embodiments, the various communication and/or operational (e.g., CCT) modes of a luminaire can be set at the factory, at distribution, or in the field. To meet current and emerging code compliance, performance markings on a luminaire can indicate and correspond to the desired communication and/or operational mode(s). Economical, field-installed nameplates can identify the various electrical ratings and communication and/or operational modes, and when the luminaire is installed, permanently program the communication and/or operational modes. Other settings, such as dimming protocols, can likewise be configured. The interface between the nameplate and internal logic can use mechanical, electrical or optical means, for example.

Accordingly, in some embodiments of the disclosure, the technology provides product markings and supports regulatory compliance. For example, nameplates can indicate energy codes and rebate opportunities, for compliance with product labeling and to facilitate compliance confirmation by local authorities who may have jurisdiction. Further, luminaires that include example switches can be subject to meeting certain standards and/or requirements. For example, Underwriters Laboratories (UL), the National Electric Code (NEC), the National Electrical Manufacturers Association (NEMA), the International Electrotechnical Commission (IEC), the Federal Communication Commission (FCC), the Illuminating Engineering Society (IES), and the Institute of Electrical and Electronics Engineers (IEEE) set standards as to luminaires. Use of example embodiments described herein meet (and/or allow a corresponding luminaire to meet) such standards when required.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of configurable communication and/or operational modes for lighting systems will be described more fully hereinafter with reference to the accompanying drawings, in which example embodiments of configurable communication and/or operational modes for lighting systems are shown. Configurable communication and/or operational modes for lighting systems may, however, be embodied in many different forms and should not be construed as limited to the example embodiments set forth herein. Rather, these example embodiments are provided so that this disclosure will be thorough and complete, and will fully convey the scope of configurable communication and/or operational modes for lighting systems to those of ordinary skill in the art. Like, but not necessarily the same, elements (also sometimes called components) in the various figures are denoted by like reference numerals for consistency.

Terms such as "first", "second", "top", "bottom", "side", and "within" are used merely to distinguish one component (or part of a component or state of a component) from another. Such terms are not meant to denote a preference or a particular orientation, and are not meant to limit embodiments of configurable communication and/or operational modes for lighting systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Referring now to FIG. 1, multiple views of the luminaire 100 are shown. FIG. 1A illustrates a side perspective view of the luminaire 100. FIG. 1B illustrates a top perspective view of the luminaire 100. FIG. 1C illustrates a view of the light-emitting bottom of the luminaire 100, showing a lens 120 in a light-emitting aperture 115 of the luminaire 100. FIG. 1D illustrates a view of the light-emitting bottom of the luminaire 100 with the lens 120 removed from the light-emitting aperture 115 of the luminaire. FIG. 1E illustrates a view of the light-emitting bottom of the luminaire 100 with the lens 120 and an associated reflector 130 removed from the light-emitting aperture 115 of the luminaire. FIG. 1F illustrates a cutaway perspective view of the luminaire 100. FIG. 1G illustrates another cutaway perspective view of the luminaire 100. FIG. 1H illustrates another cutaway view of the luminaire 100. FIGS. 1I, 1J, and 1K provide detailed views of a portion of the luminaire 100 comprising a cover 126 and an associated access aperture 129 for providing internal access to the luminaire 100. In FIG. 1I, the cover 126 is fully removed. In FIG. 1J, the cover 126 is positioned adjacent the access aperture 129, for example in connection with attachment or removal of the cover 126. In FIG. 1K, the cover 126 is attached to the luminaire 100.

Figure 1B:
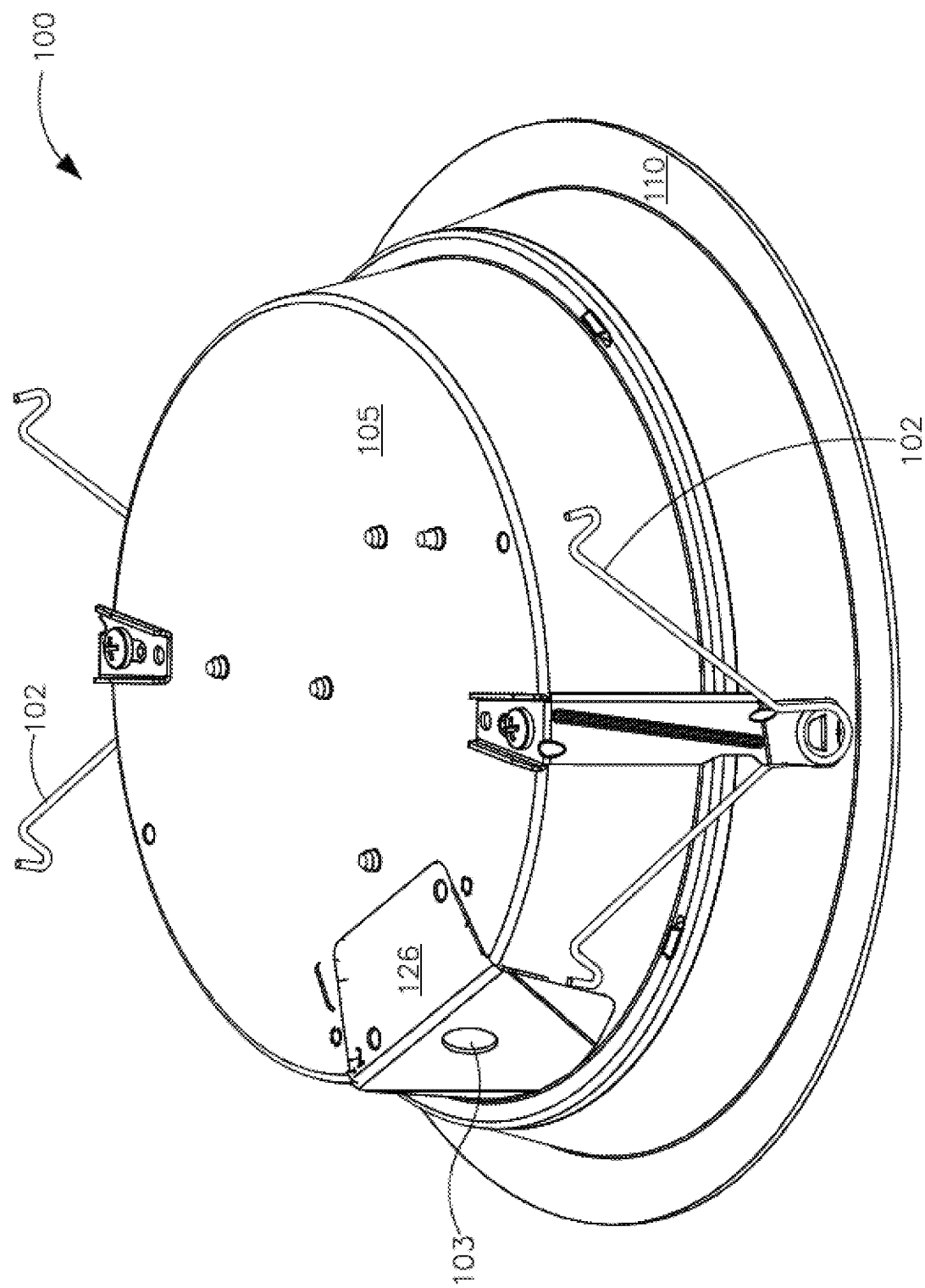
Figure 1C:
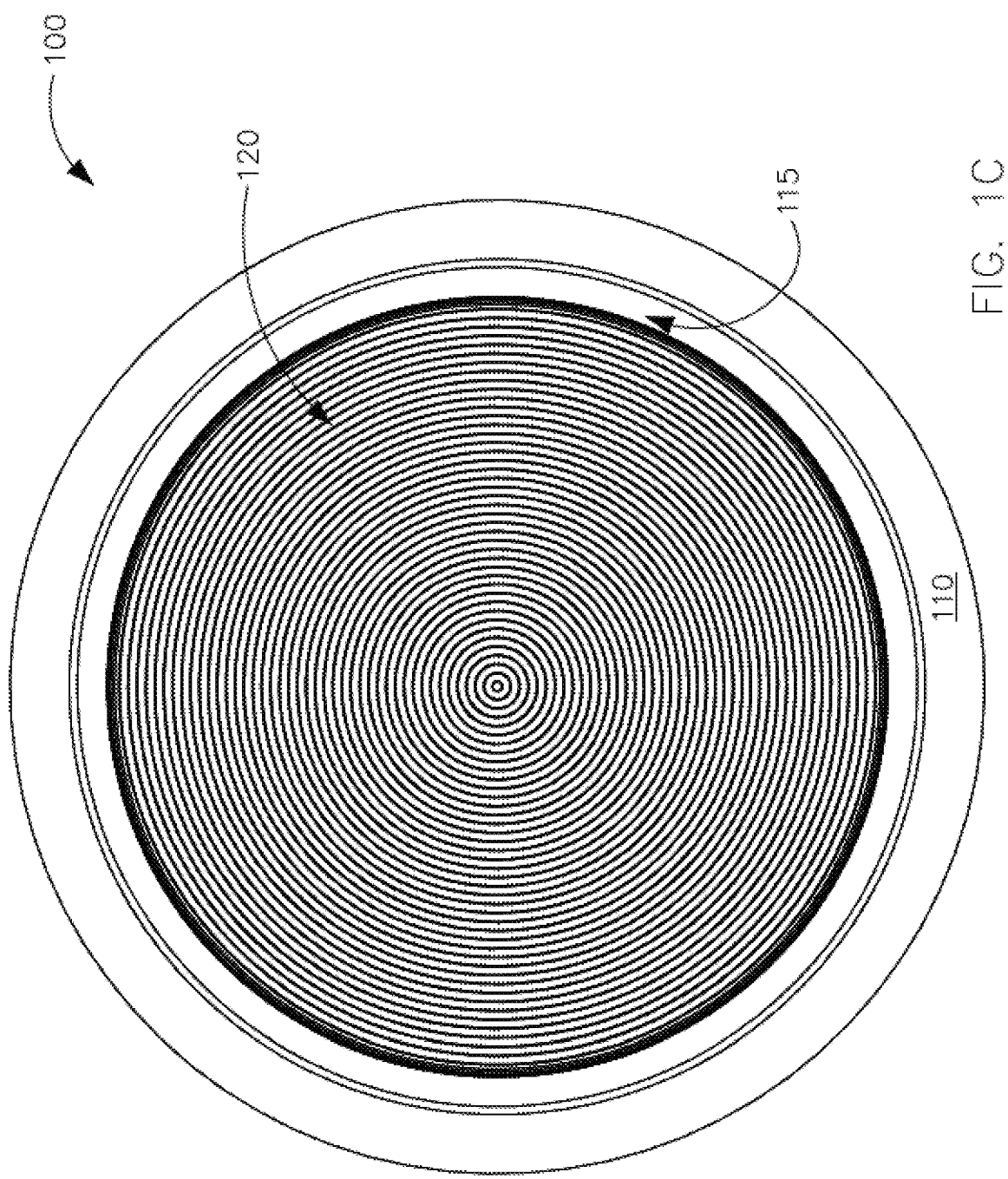
Figure 1E:
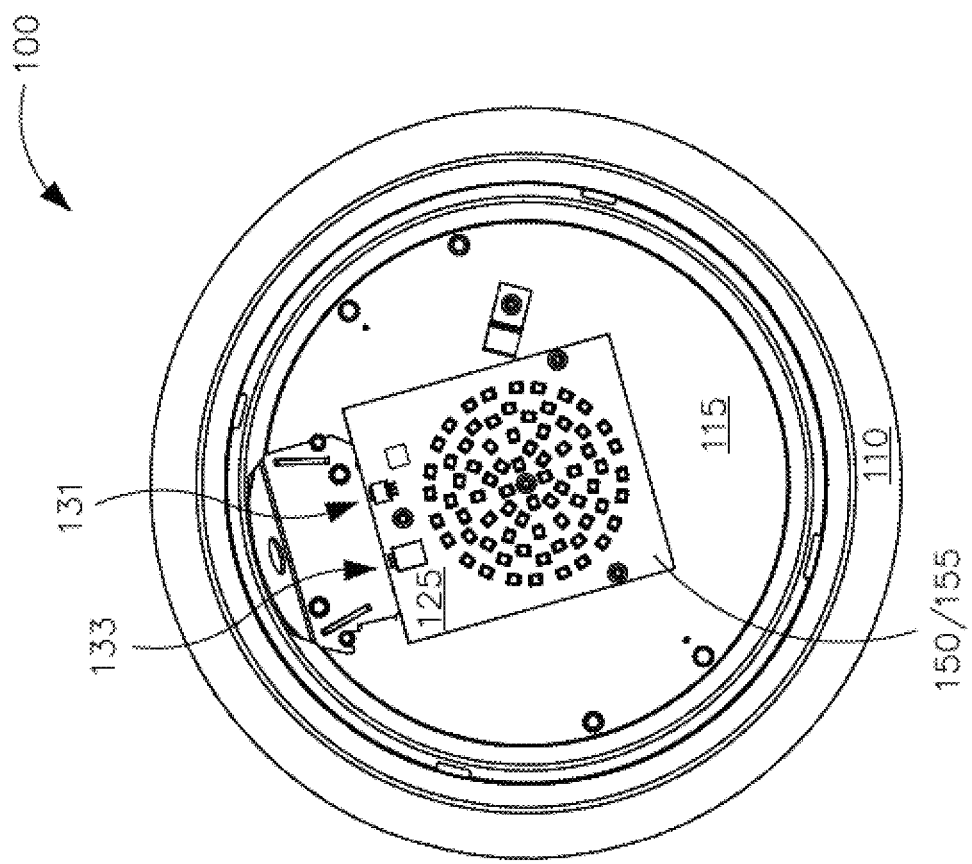
Figure 1D:
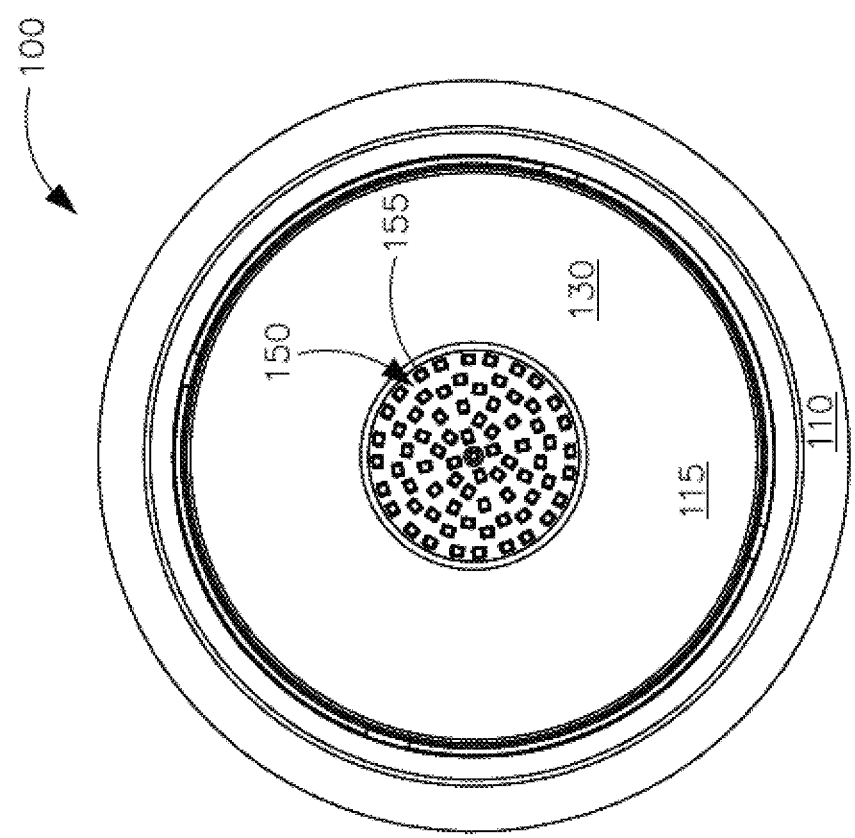
Figure 1F:
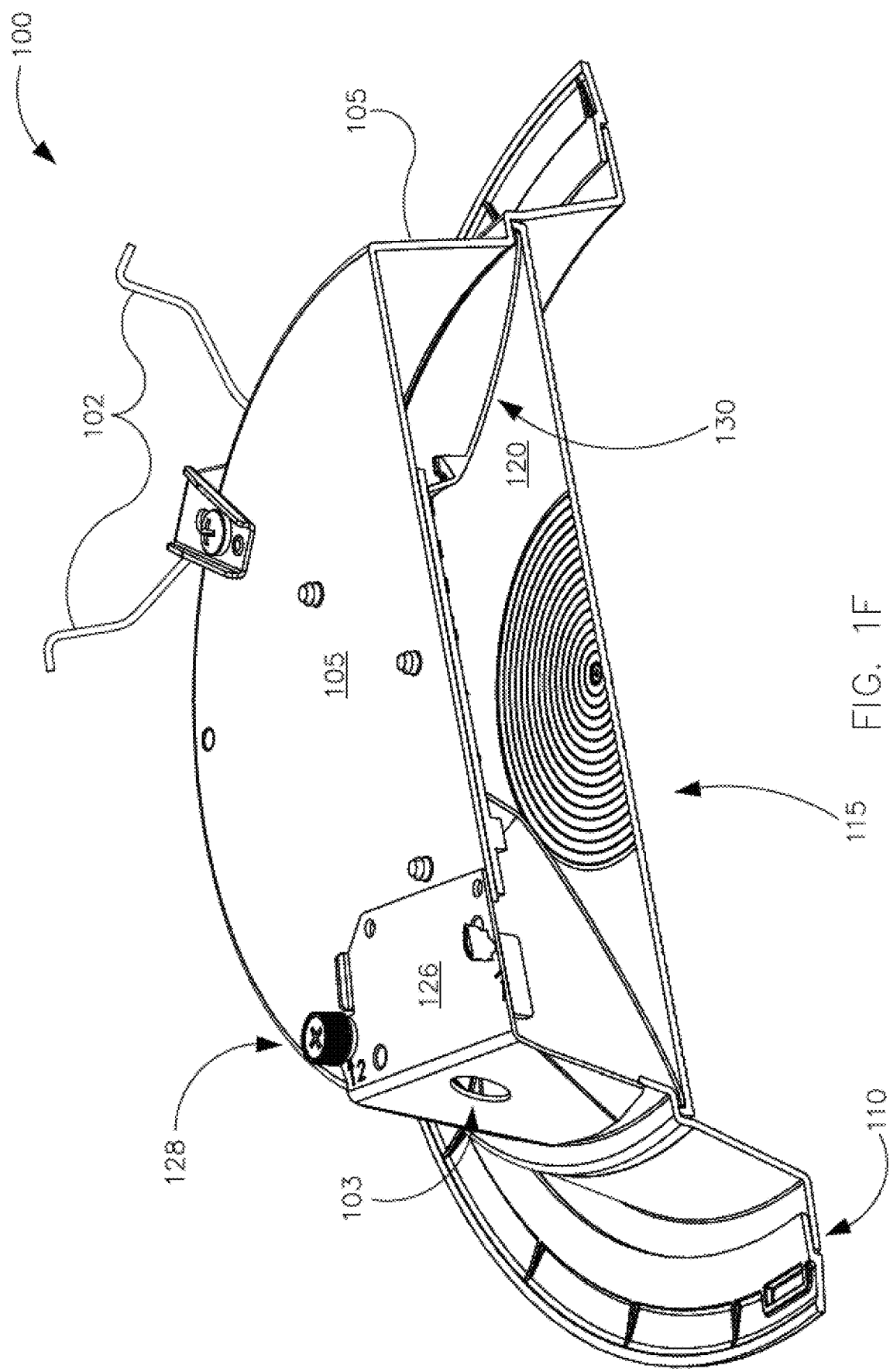
Figure 1G:
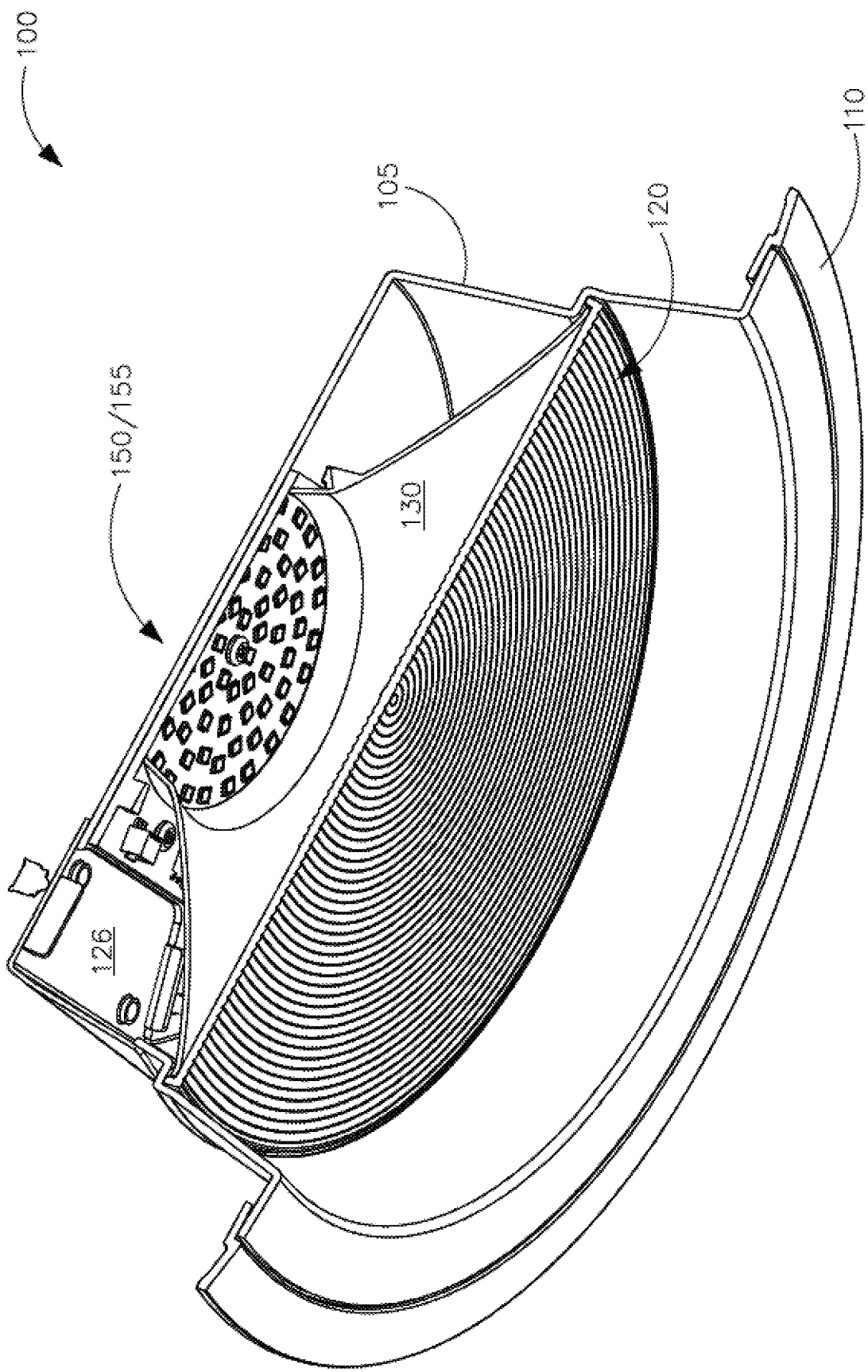
Figure 1H:
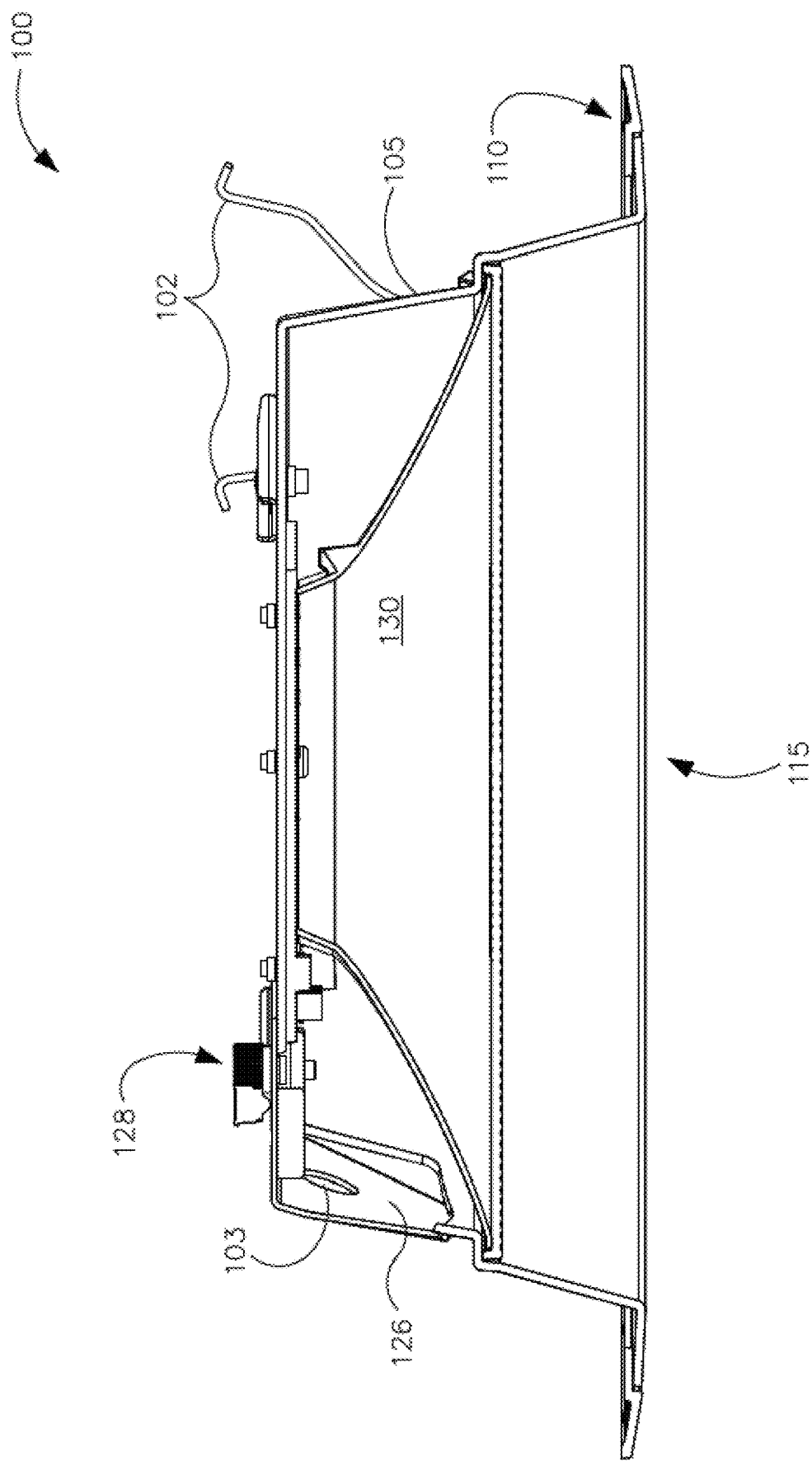

As best seen in the views of FIGS. 1A and 1B, the illustrated example luminaire 100 is suited for inserting in an aperture in a ceiling to provide overhead lighting. In this example embodiment, the luminaire 100 can be characterized as an overhead light or a recessed ceiling light. Various other indoor and outdoor luminaires that may be mounted in a wide range of orientations can be substituted for the luminaire 100 illustrated in FIG. 1.

The illustrated example luminaire 100 of FIG. 1 comprises a housing 105 that is circular with a protruding trim 110 that extends circumferentially about the housing 105. When the luminaire 100 is installed in a ceiling aperture, the rim 100 circumscribes and covers the edge of the ceiling aperture for aesthetics, for support, and for blocking of debris from above the ceiling. Hanger clips 102 hold the luminaire 100 in place in installation.

Figure 1J:
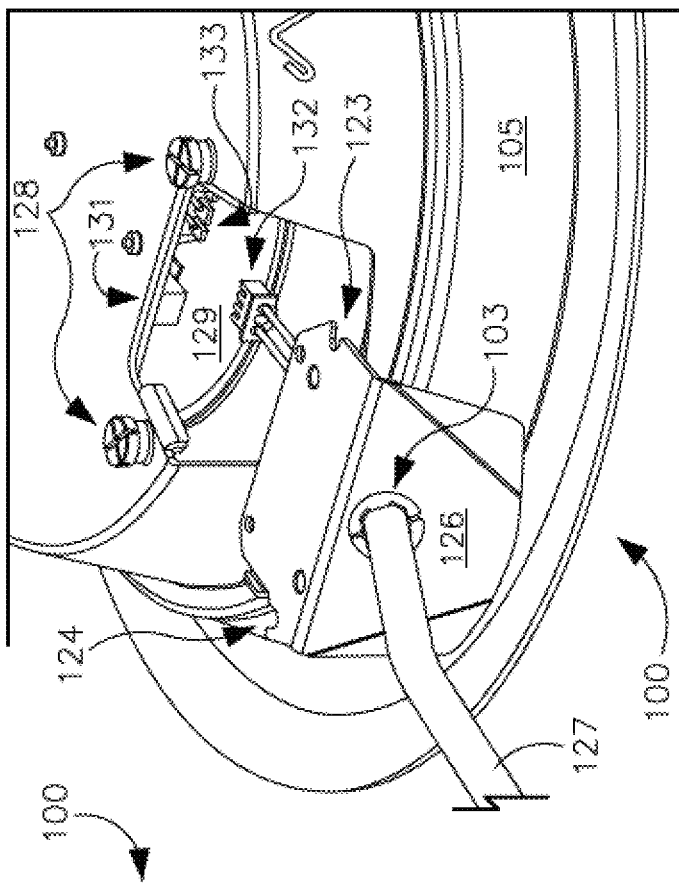
Figure 1I:
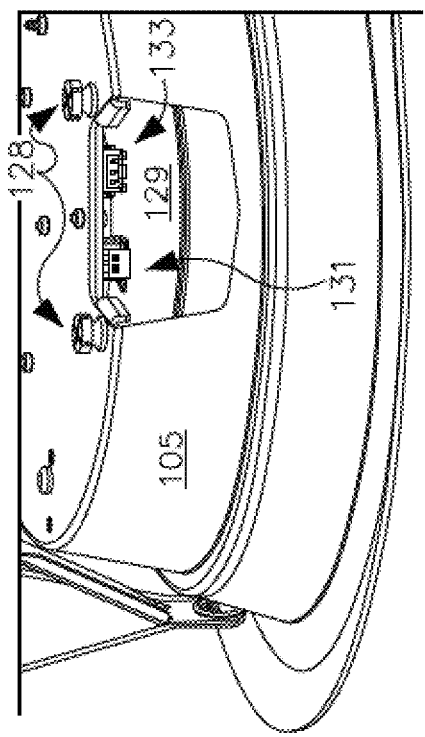
Figure 1K:
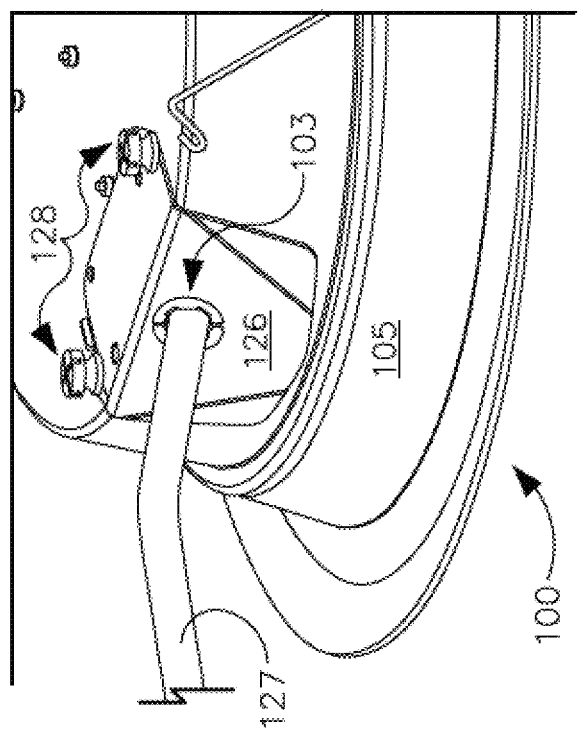

As best illustrated in FIGS. 1I, 1J, and 1K, the example luminaire 100 comprises an access aperture 129 and an associated cover 126. The access aperture 129 provides access to the interior of the luminaire housing 105, for example in the field and/or during luminaire installation. An installer can remove the cover 126 and manually set an example switch 131 (in this case, a dual inline pin (DIP) switch) to configure the communication mode used by the luminaire 100. As illustrated, the switch 131 is mounted on a circuit board adjacent the access aperture 129, thereby facilitating convenient and efficient access in the field or at a distribution center, for example.

An electrical cable 127 extends through a wiring aperture 103 in the cover 126. The electrical cable 127 terminates in a plug 132 that mates with a receptacle 133 that is mounted inside the housing 105 adjacent the access aperture 129 for convenient field access. In this example, the example cover 126 includes two notches 123, 124 that each receives a respective screw 128 for holding the cover 126 in place. The notch 123 is disposed on the right side of the cover 126 and is sized to receive one of the screws 128. Meanwhile, the notch 124 is disposed on a left side of the cover 126 and is sized to receive the other screw 128.

The left notch 124 and the right notch 123 are oriented so that the cover 126 is rotatable about the right screw 128 when the right screw 128 is loosely disposed in the right notch 123. In other words, cover rotation can occur when the right screw 128 is in the right notch 123 with threads engaged but prior to tightening. In this position, the cover 126 can rotate clockwise about the right screw 128. Thus, the right screw 128 provides an axis of rotation for the cover 126. This clockwise rotation facilitates convenient manipulation of the cover 126 by a person working the cover 126 to cover the access aperture 129, with the screws 128 engaged but not fully tightened. The clockwise rotation of the cover 126 about the right screw 128 provides the person with a capability to slide the left notch 124 of the cover 126 conveniently under the head of the left screw 128. Once the cover 126 is rotated so the left notch 124 is under the head of the left screw 128, the person (for example an installer) can tighten the two screws 128 to secure the cover 126.

To remove the cover 126, the person loosens the two screws 128 and then rotates the cover 126 counterclockwise about the right screw 128 so that the left notch 124 moves out from under the head of the left screw 128. Once the left notch 124 is free from the left screw 128, the installer can pull the right notch 123 out from under the right screw 128 to fully remove the cover 126.

As best seen in the views of FIGS. 1A, 1C, 1F, and 1G, the lens 120 of the luminaire 100 is positioned adjacent the lower, exit side of the light-emitting aperture 115. As illustrated, the lens 120 can mix and blend light emitted by two groups of light emitting diodes 150, 155, with each group having the same or a different color temperature. The group of light emitting diodes 150 can be characterized as one light emitting diode light source, while the group of light emitting diodes 155 can be characterized as another light emitting diode light source. Other embodiments of a light emitting diode light source may have a single light emitting diode or more light emitting diodes than the embodiment illustrated in FIG. 1. A reflector 130 is disposed in and lines the aperture 115 to guide and manage the emitted light between the light emitting diodes 150, 155 and the lens 120. In some embodiments, an upper lens (not illustrated) replaces the reflector 130.

The light emitting diodes 150, 155 are mounted on a substrate 125, for example a circuit board, and form part of a circuit. In the illustrated embodiment, the light emitting diodes 150, 155 are interspersed. In other embodiments, the light emitting diodes 150, 155 may be separated from one another or spatially segregated according to color temperature or other appropriate parameter. As discussed in further detail below, the circuit 200 supplies electricity to the light emitting diodes 150, 155 with a level of flexibility that facilitates multiple configurations suited to different applications and installation parameters.

Figure 2A:
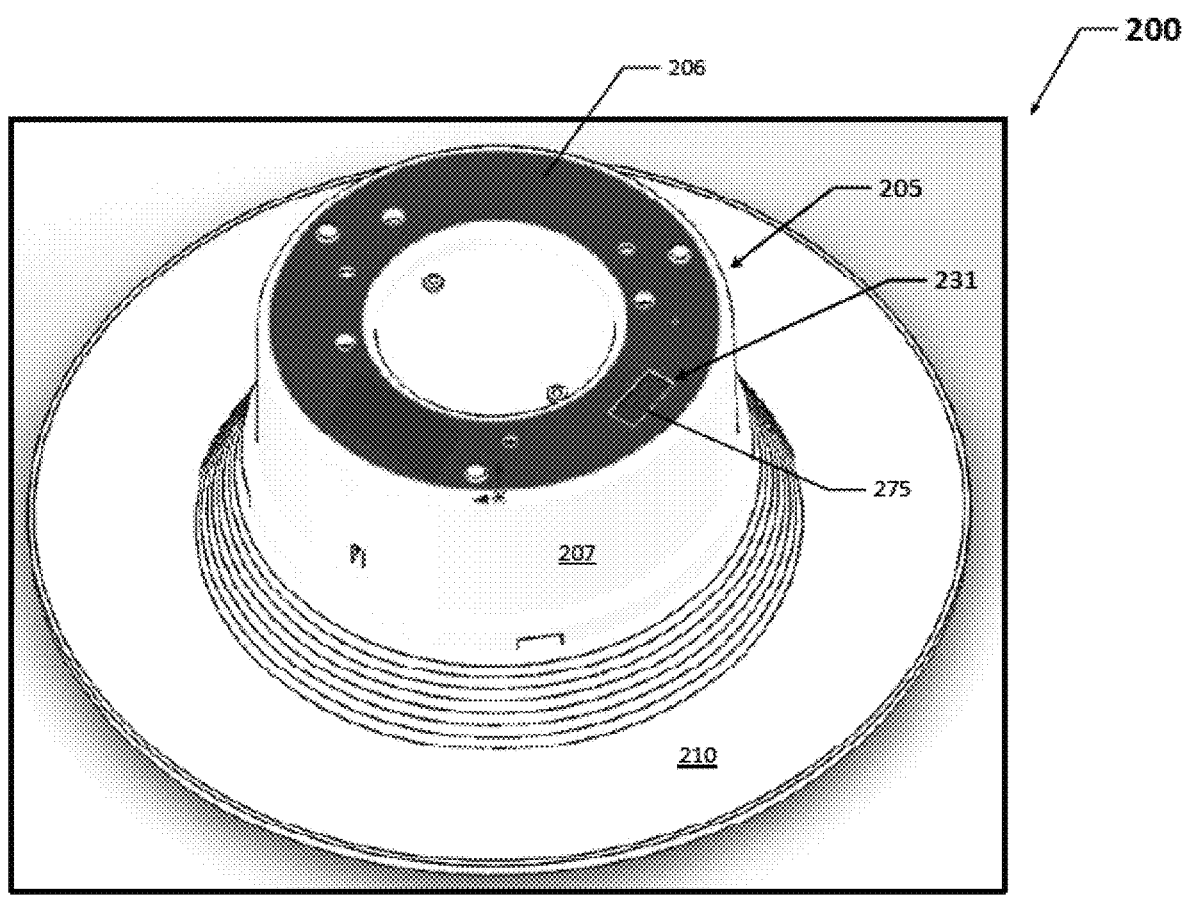
FIGS. 2A-2C show another luminaire that includes a switch in accordance with certain example embodiments.
Figure 2B:
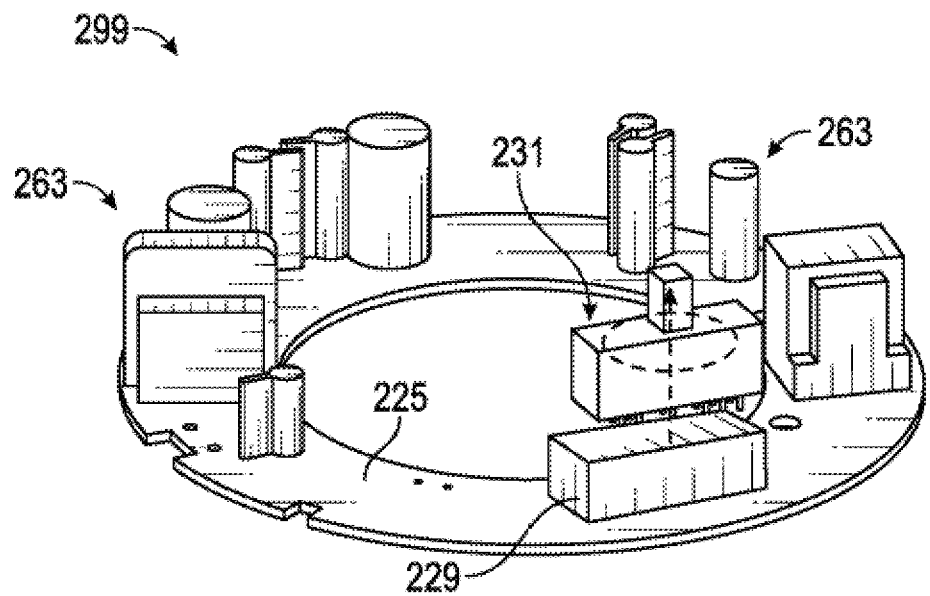
Figure 2C:
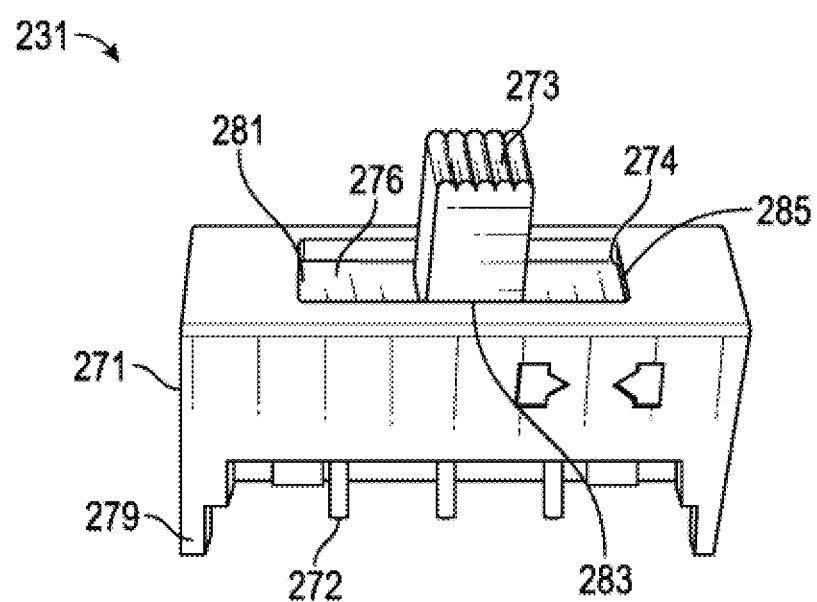

FIGS. 2A-2C show a luminaire 200 that includes a switch 231 in accordance with certain example embodiments. Specifically, FIG. 2A shows a top-side perspective view of the luminaire 200. FIG. 2B shows a partially-exploded top-side perspective view of a circuit board assembly 299 of the luminaire 600. FIG. 2C shows a top-side perspective view of the switch 231.

Referring to FIGS. 1A-2C, the luminaire 200 of FIG. 2A can include a housing 205 that is cylindrical in shape, having a top surface 206 and a side surface 207. Coupled to the bottom end of the housing 205 of FIG. 2A can be a trim 210. The housing 205 can be made of one or more of a number of thermally conductive materials (e.g., stainless steel, aluminum). In such a case, the housing 205 can act as a heat sink, absorbing heat generated by one or more components (e.g., LEDs, power modules, hardware processor, energy storage device) in thermal communication with the housing 205, and subsequently dissipating the absorbed heat into the ambient environment.

As with the luminaires discussed above, the luminaire 200 can include one or more of a number of other components. Such components can be disposed within a cavity formed by the housing 205, disposed on a portion (e.g., the housing 205, the trim 210) of the luminaire 200, and/or physically remote from but in communication with the luminaire 200. In this case, as shown in FIGS. 2A-2C, some of those other components include a switch 231 and a number of other electrical components 263 (e.g., controller, capacitors, resistors, diodes, transistors, integrated circuits, hardware processor) disposed on a substrate 225.

The substrate 225, the electrical connector 229, the other electrical components 263, and part of the switch 231 in this case are disposed within a cavity formed by the housing 205. In order for a user to be able to access the switch 231, at least part of the switch 231 can be disposed within and protrude through an aperture 275 in a wall (in this case, the top surface 206) of the housing 205. As an alternative, part of the switch 231 can protrude through an aperture in the side surface 207 of the housing 205. Permitting a user to access the switch 231 protruding through the aperture 275 in the housing 205 facilitates configuration of the communication mode of the luminaire 200 and avoids the need to open and/or disassemble the luminaire 200, as was the case in FIGS. 1A-1K.

The example switch 231 can be used to select one or more of a number of variables that affect the operation of the luminaire 200. For example, the switch 231 can be used to select one of a number of CCTs. The switch 231 can be any of a number of types of switches, including but not limited to one or more DIP switches, one or more SIPP switches, one or more rocker switches, one or more reed switches, one or more magnetic switches, one or more rotary switches, one or more rotary dials, one or more selectors or selector switches, one or more slide switches (as shown in FIG. 2C), one or more snap switches, one or more thumbwheels, one or more toggles or toggle switches, one or more keys or keypads, and one or more buttons or pushbuttons.

As mentioned above, the switch 231 of FIGS. 2A-2C is a slide switch. The switch 231 has a body 271 and a number of coupling features 272 (in this case, pins) disposed on the bottom of the body 271 that allow the switch 231 to become electrically coupled to an electrical connector 229 on the substrate 225 (and therefore also to one or more of the other components 263 mounted on the substrate 225, such as a controller, as described above). In some cases, adjacent to the coupling features 272 can be disposed one or more mechanical coupling features 279 (e.g., tabs, posts). In such a case, mechanical coupling features 279 can act as guides to properly position and align the coupling features 272 of the switch 231 relative to an electrical connector 229 mounted on the substrate 225. At the top end of the body 271 is an actuator 273 that extends outward from a plate 276. The plate 276 is disposed within the body 271 and has a length that is less than the length of the body 271. The plate 276 also corresponds to a slot 274 that traverses the top end of the body 271. The actuator 273 extends through the slot 274 and can be accessible by a user.

The switch 231 can include a number of detents and/or other features to limit or create discrete stopping locations for the actuator 273 (and so also the plate 276) along the length of the slot 274. Each of these detents and/or other features can be associated with a certain value of a variable that affects the operation of the luminaire 200. For example, if the switch 231 is used to select a communication mode of the luminaire, the left end 281 of the slot 274 can be associated with Zigbee, detent 283 at the middle of the slot 274 can be associated with standard Bluetooth, and the right end 285 of the slot 274 can be associated with Bluetooth Low Energy (BLE).

Figure 3:
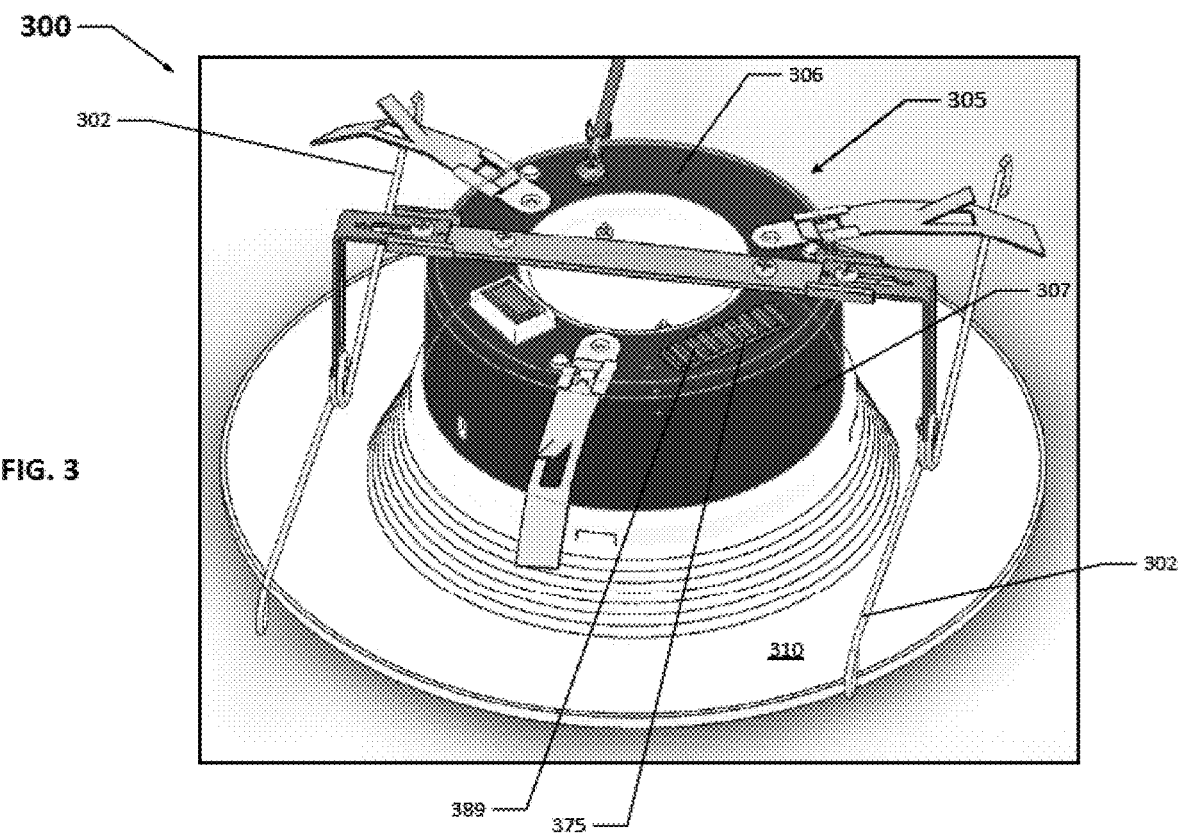
FIG. 3 shows a luminaire that is configured to receive a switch in accordance with certain example embodiments.

Example switches 231 can be used with a new luminaire 200. Alternatively example switches 231 can be retrofit into existing luminaires. Also, while FIGS. 2A-2C show that the switch 231 is disposed within and coupled to the housing 205, the switch 231 can alternatively be disposed entirely within the housing 205 (as in FIGS. 1A-1K) and/or coupled to some other portion (e.g., the trim 210) of the luminaire 200. In some cases, a luminaire can be manufactured without the switch, but with the ability to receive an example switch at a later time (e.g., during installation). For example, FIG. 3 shows a luminaire 300 that is configured to receive a switch in accordance with certain example embodiments. Referring to FIGS. 1A-3, the luminaire 300 can be substantially the same as the luminaires discussed above, except as described below.

For example, the luminaire 300 of FIG. 3 can include a housing 305 that is cylindrical in shape, having a top surface 306 and a side surface 307. Coupled to the bottom end of the housing 305 of FIG. 3 can be a trim 310. Further, hanger clips 302 can be used to hold the luminaire 300 in place upon installation. In this case, the example switch is not coupled to the luminaire 300. Instead, there is a removable plug 389 disposed in the aperture 375 that traverses the top surface 306 of the housing 305. The removable plug 389 can be used to keep dust and other elements in the ambient environment from entering the cavity formed by the housing 305.

In such a case, when a user (e.g., an installer, an electrician, a homeowner) wants to install an example switch on the luminaire 300, the removable plug 389 can easily be removed (with or without a tool), and the example switch can be inserted into the connector inside the housing 305 that is subsequently exposed. Example switches can be incorporated into any of a number of different types of luminaires (light fixtures). For instance, as shown in FIGS. 2A-3, example switches can be used with down light fixtures. Other types of luminaires that can be used with example switches can include, but are not limited to, troffer lights, under cabinet lights, pendent lights, recessed lights, and wall scones.

Figure 4A:
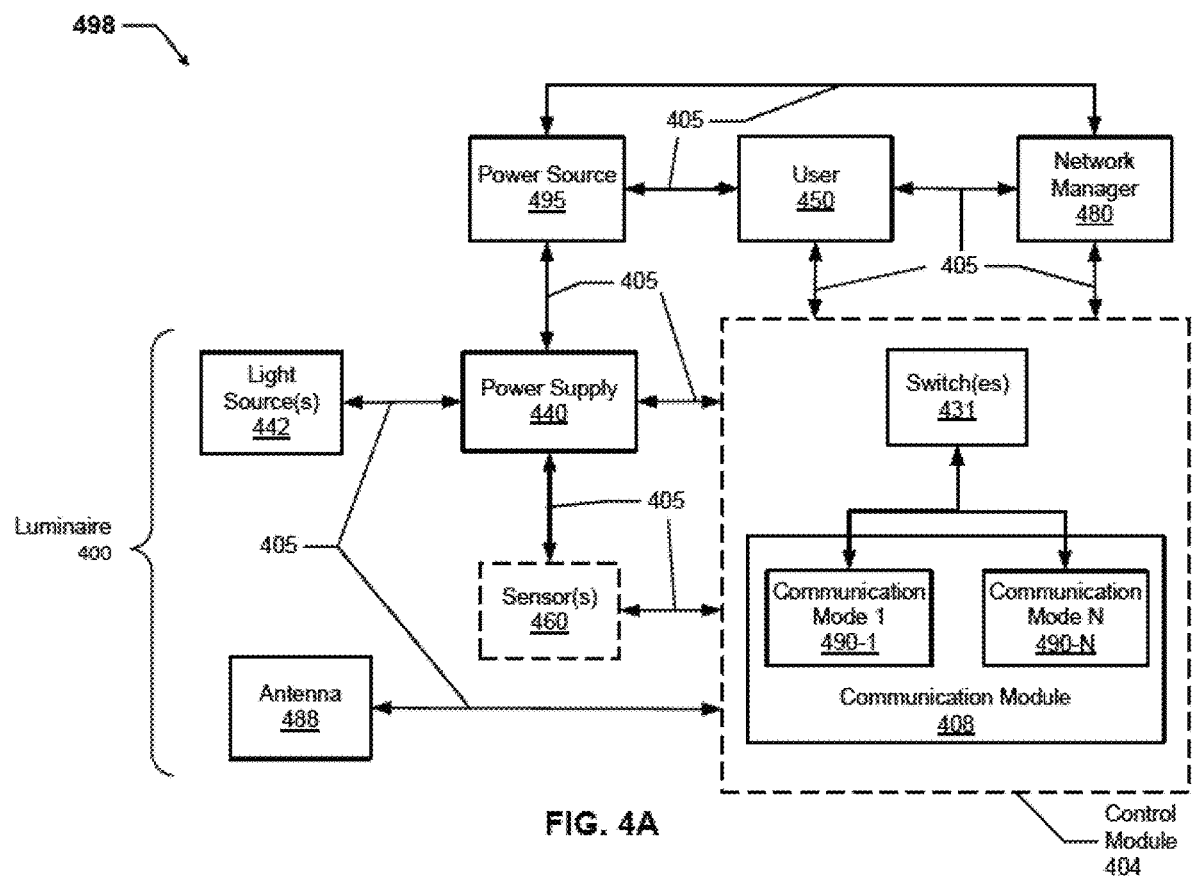
FIGS. 4A and 4B show a system that includes a light fixture with a switch in accordance with certain example embodiments.
Figure 4B:
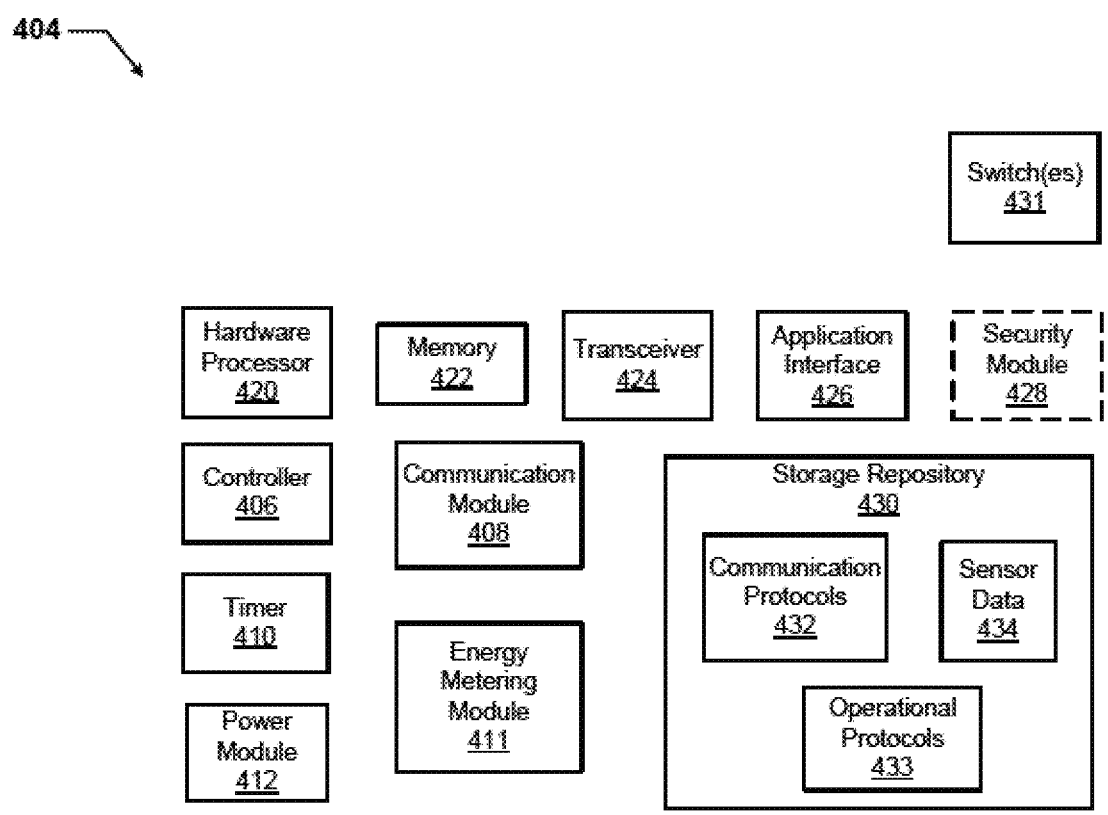

FIGS. 4A and 4B show a lighting system 498 that includes a luminaire 400 and a control module 404 in accordance with certain example embodiments. The lighting system 498 can include a power source 495, a user 450, a network manager 480, and the luminaire 400. In addition to the control module 404, the luminaire 400 can include a power supply 440, a number of light sources 442, one or more antennae 488, and one or more optional sensors 460. The communication module 408 of the control module 404 can include one or more switches 431 and multiple communication modes 490 (e.g., communication mode 490-1, communication mode 490-N).

As shown in FIGS. 4A and 4B, aside from the switch 431 and the communication module 408, the control module 404 can include one or more of a number of components. Such components, can include, but are not limited to, a controller 406, a timer 410, an energy metering module 411, a power module 412, a storage repository 430, a hardware processor 420, a memory 422, a transceiver 424, an application interface 426, and, optionally, a security module 428. The components shown in FIGS. 4A and 4B are not exhaustive, and in some embodiments, one or more of the components shown in FIG. 4B may not be included in an example light fixture. Any component of the example luminaire 400 can be discrete or combined with one or more other components of the luminaire 400.

Referring to FIGS. 1-4B, a user 450 may be any person that interacts with light fixtures (e.g., luminaire 400) and/or example control modules (e.g., control module 404). Examples of a user 450 may include, but are not limited to, an engineer, an electrician, an instrumentation and controls technician, a mechanic, an operator, a property manager, a homeowner, a tenant, an employee, a consultant, a contractor, and a manufacturer's representative. The user 450 can use a user system (not shown), which may include a display (e.g., a GUI). The user 450 interacts with (e.g., sends data to, receives data from) the control module 404 of the luminaire 400 via the application interface 426 (described below). The user 450 can also interact with a network manager 480, the power source 495, and/or one or more of the sensors 460. Interaction between the user 450, the luminaire 400, the network manager 480, and the sensors 460 can be conducted using communication links 405.

Each communication link 405 can include wired (e.g., Class 1 electrical cables, Class 2 electrical cables, Ethernet cables, electrical connectors, electrical conductors) and/or wireless (e.g., Wi-Fi, visible light communication, cellular networking, Bluetooth, Bluetooth Low Energy (BLE), Zigbee, WirelessHART, ISA100, Power Line Carrier, RS485, DALI) technology. One or more of these technologies can be a communication mode 490, described below. For example, a communication link 405 can be (or include) a wireless link between the control module 404 and the user 450. The communication link 405 can transmit signals (e.g., power signals, communication signals, control signals, data) between the luminaire 400 and the user 450, the power source 495, the network manager 480, and/or one or more of the sensors 460.

The network manager 480 is a device or component that controls all or a portion (e.g., a communication network) of the system 498 that includes the control module 404 of the luminaire 400, the power source 495, the user 450, and the sensors 460. The network manager 480 can be substantially similar to the control module 404, or portions thereof, as described below. For example, the network manager 480 can include a controller. Alternatively, the network manager 480 can include one or more of a number of features in addition to, or altered from, the features of the control module 404 described below. As described herein, communication with the network manager 480 can include communicating with one or more other components (e.g., another light fixture) of the system 498. In such a case, the network manager 480 can facilitate such communication.

The power source 495 of the system 498 provides AC mains or some other form of power to the luminaire 400, as well as to one or more other components (e.g., the network manager 480) of the system 498. The power source 495 can include one or more of a number of components. Examples of such components can include, but are not limited to, an electrical conductor, a coupling feature (e.g., an electrical connector), a transformer, an inductor, a resistor, a capacitor, a diode, a transistor, and a fuse. The power source 495 can be, or include, for example, a wall outlet, an energy storage device (e.g. a battery, a supercapacitor), a circuit breaker, and/or an independent source of generation (e.g., a photovoltaic solar generation system). The power source 495 can also include one or more components (e.g., a switch, a relay, a controller) that allow the power source 495 to communicate with and/or follow instructions from the user 450, the control module 404, and/or the network manager 480.

The power source 495 can be coupled to the power supply 440 of the luminaire 400. In this case, the power source 495 includes one or more communication links 405 (e.g., electrical conductors), at the distal end of which can be disposed a coupling feature (e.g., an electrical connector). The power supply 440 of the luminaire 400 can also include one or more communication links 405 (e.g., electrical conductors, electrical connectors) that complement and couple to the power source 495. In this way, the AC mains provided by the power source 495 is delivered directly to the power supply 440 of the luminaire 400.

The one or more optional sensors 460 can be any type of sensing device that measures one or more parameters. Examples of types of sensors 460 can include, but are not limited to, a passive infrared sensor, a photocell, a differential pressure sensor, a humidity sensor, a pressure sensor, an air flow monitor, a gas detector, and a resistance temperature detector. Parameters that can be measured by a sensor 460 can include, but are not limited to, movement, occupancy, ambient light, infrared light, temperature within the light fixture housing, and ambient temperature. The parameters measured by the sensors 460 can be used by the controller 406 of the control module 404 and/or by one or more other components (e.g., the power supply 440) of the luminaire 400 to operate the luminaire 400. A sensor 460 can receive power and/or control signals from the power source 495 and/or the control module 404 (e.g., through the power module 412) using communication links 405.

The one or more antennae 488 are used to enhance the range that the luminaire 400 can communication with another component (e.g., a user 450, the network manager 480) of the system 498. An antenna 488 can be disposed on the housing or within the housing of the luminaire 400. The antenna can have a high profile (e.g., extend from the housing of the luminaire 400) or a low profile (e.g., integrated on a circuit board within the housing of the luminaire 400). If there are multiple antennae 488, the controller 406 can determine when a particular antenna 488 is utilized and with which communication mode 490 an antenna 488 is used.

The controller 406 of the control module 404 can be configured to communicate with (and in some cases control) the sensor 460. In some other cases, a sensor 460 can be part of the control module 404, where the controller 406 of the control module 404 can be configured to communicate with (and in some cases control) the sensor 460. As yet another alternative, a sensor 460 can be a new device that is added to the luminaire 400, where the controller 406 of the control module 404 is configured to communicate with (and in some cases control) the sensor 460. The controller 406 and a sensor 460 can be coupled to each other using communication links 405. Each sensor 460 can use one or more of a number of communication protocols 432 that are known and used by the control module 404.

The user 450, the network manager 480, the power source 495, and/or the sensors 460 can interact with the control module 404 of the luminaire 400 using the application interface 426 in accordance with one or more example embodiments. Specifically, the application interface 426 of the control module 404 receives data (e.g., information, communications, instructions, updates to firmware) from and sends data (e.g., information, communications, instructions) to the user 450, the network manager 480, the power source 495, and/or each sensor 460. As explained below, the control module 404 has a communication module 408 that includes multiple communication modes 490 (e.g., communication mode 490-1, communication mode 490-N) that are used by the control module 406 to communicate with one or more other components (e.g., the user 450, the network manager 480) in the system 498. A particular communication mode 490 is selected using the switch 431.

The user 450, the network manager 480, the power source 495, and/or each sensor 460 can include an interface to receive data from and send data to the control module 404 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The control module 404, the user 450, the network manager 480, the power source 495, and/or the sensors 460 can use their own system or share a system in certain example embodiments. Such a system can be, or contain a form of, an Internet-based or an intranet-based computer system that is capable of communicating with various software. A computer system includes any type of computing device and/or communication device, including but not limited to the control module 404. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 5.

Further, as discussed above, such a system can have corresponding software (e.g., user software, sensor software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 498.

The luminaire 400 can include a light fixture housing. The light fixture housing can include at least one wall that forms a light fixture cavity. In some cases, the light fixture housing can be designed to comply with any applicable standards so that the luminaire 400 can be located in a particular environment. The light fixture housing can form any type of luminaire 400, including but not limited to a troffer light fixture, a down can light fixture, a recessed light fixture, and a pendant light fixture. The light fixture housing can also be used to combine the luminaire 400 with some other device, including but not limited to a ceiling fan, a smoke detector, a broken glass detector, a garage door opener, and a wall clock.

The light fixture housing of the luminaire 400 can be used to house or be located proximate to one or more components of the luminaire 400, including the control module 404 and one or more sensors 460. For example, the control module 404 (which in this case includes the controller 406, the communication module 408, the timer 410, the energy metering module 411, the power module 412, the storage repository 430, the hardware processor 420, the memory 422, the transceiver 424, the application interface 426, the switches 431, and the optional security module 428) can be disposed within the cavity formed by the housing of the luminaire 400. In alternative embodiments, any one or more of these or other components (e.g., a sensor 460, a switch 431) of the luminaire 400 can be disposed on or remotely from the housing of the luminaire 400.

The control module 404 can include a housing (not shown in FIGS. 4A and 4B). Such a housing can include at least one wall that forms a cavity. One or more of the various components (e.g., controller 406, hardware processor 420) of the control module 404 can be disposed within the cavity formed by such a housing. Alternatively, a component of the control module 404 can be disposed on such a housing or can be located remotely from, but in communication with, such a housing. As yet another alternative, the control module 404 can be a number of discrete components that are disposed on a circuit board.

The storage repository 430 can be a persistent storage device (or set of devices) that stores software and data used to assist the control module 404 in communicating with the user 450, the network manager 480, the power source 495, and one or more sensors 460 within the system 498. In one or more example embodiments, the storage repository 430 stores one or more communication protocols 432, operational protocols 433, and sensor data 434. The communication protocols 432 can be any of a number of protocols that are used to send and/or receive data, using a communication mode 490, between the control module 404 and the user 450, the network manager 480, the power source 495, and one or more sensors 460. One or more of the communication protocols 432 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 432 can provide a layer of security to the data transferred within the system 498.

The operational protocols 433 can be any algorithms, formulas, logic steps, and/or other similar operational procedures that the controller 406 of the control module 404 follows based on certain conditions at a point in time. An example of an operational protocol 433 is directing the controller 406 to provide power and to cease providing power to the power supply 440 at pre-set points of time. Another example of an operational protocol 433 is to check one or more communication links 405 with the network manager 480 and, if a communication link 405 is not functioning properly, allow the control module 404 to operate autonomously from the rest of the system 498.

As another example of an operational protocol 433, configurations of the control module 404 can be stored in memory 422 (e.g., non-volatile memory) so that the control module 404 (or portions thereof) can operate regardless of whether the control module 404 is communicating with the network manager 480 and/or other components in the system 498. Still another example of an operational protocol 433 is identifying an adverse condition or event (e.g., excessive humidity, no pressure differential, extreme pressure differential, high temperature) based on measurements taken by a sensor 460. In such a case, the controller 406 can notify the network manager 480 and/or the user 450 as to the adverse condition or event identified. Yet another example of an operational protocol 433 is to have the control module 404 operate in an autonomous control mode if one or more components (e.g., the communication module 408, the transceiver 424) of the control module 404 that allows the control module 404 to communicate with another component of the system 498 fails.

Sensor data 434 can be any data associated with (e.g., collected by) each sensor 460 that is communicably coupled to the control module 404. A sensor 460 can be newly added or pre-existing as part of the luminaire 400. Such data can include, but is not limited to, a manufacturer of the sensor 460, a model number of the sensor 460, communication capability of a sensor 460, power requirements of a sensor 460, and measurements taken by the sensor 460. Examples of a storage repository 430 can include, but are not limited to, a database (or a number of databases), a file system, a hard drive, flash memory, some other form of solid state data storage, or any suitable combination thereof. The storage repository 430 can be located on multiple physical machines, each storing all or a portion of the communication protocols 432, the operational protocols 433, and/or the sensor data 434 according to some example embodiments. Each storage unit or device can be physically located in the same or in a different geographic location.

The storage repository 430 can be operatively connected to the controller 406. In one or more example embodiments, the controller 406 includes functionality to communicate with the user 450, the network manager 480, the power source 495, and the sensors 460 in the system 498. More specifically, the controller 406 sends information to and/or receives information from the storage repository 430 in order to communicate with the user 450, the network manager 480, the power source 495, and the sensors 460. As discussed below, the storage repository 430 can also be operatively connected to the communication module 408 in certain example embodiments.

In certain example embodiments, the controller 406 of the control module 404 controls the operation of one or more components (e.g., the communication module 408, the timer 410, the transceiver 424) of the control module 404. For example, the controller 406 can activate the communication module 408 when the communication module 408 is in "sleep" mode and when the communication module 408 is needed to send data received from another component (e.g., a sensor 460, the user 450) in the system 498. As another example, the controller 406 can operate one or more sensors 460 to dictate when measurements are taken by the sensors 460 and when those measurements are communicated by the sensors 460 to the controller 406. As another example, the controller 406 can acquire the current time using the timer 410. The timer 410 can enable the control module 404 to control the luminaire 400 even when the control module 404 has no communication with the network manager 480.

As another example, the controller 406 can check one or more communication links 405 between the control module 404 and the network manager 480 and, if a communication link 405 is not functioning properly, allow the control module 404 to operate autonomously from the rest of the system 498. As yet another example, the controller 406 can store configurations of the control module 404 (or portions thereof) in memory 422 (e.g., non-volatile memory) so that the control module 404 (or portions thereof) can operate regardless of whether the control module 404 is communicating with the network controller 480 and/or other components in the system 498.

As still another example, the controller 406 can obtain readings from an adjacent sensor if the sensor 460 associated with the luminaire 400 malfunctions, if the communication link 405 (which can include electrical conductor 439 and/or coupling feature 459) between the sensor 460 and the control module 404 fails, and/or for any other reason that the readings of the sensor 460 associated with the luminaire 400 fails to reach the control module 404. To accomplish this, for example, the network manager 480 can instruct, upon a request from the controller 406, the adjacent sensor 460 to communicate its readings to the controller 406 of the control module 404 using communication links 405.

As still another example, the controller 406 can cause the control module 404 to operate in an autonomous control mode if one or more components (e.g., the communication module 408, the transceiver 424) of the control module 404 that allows the control module 404 to communicate with another component of the system 498 fails. Similarly, the controller 406 of the control module 404 can control at least some of the operation of one or more adjacent light fixtures in the system 498. As yet another example, the controller 406 can implement a communication mode 490 of the communication module 408 based on a position of the switch 431. If there are multiple switches 431 and/or multiple antennae 488, the controller 406 can assign one communication mode 490 (e.g., communication mode 490-1) to one component (e.g., a user 450) of the system 498, while also assigning another communication mode 490 (e.g., communication mode 490-N) to another component (e.g., the network manager 480) of the system 498

As still another example, the controller 406 can determine, using the energy metering module 411, when power is received from the power supply 440. The controller 406 can also determine, using the energy metering module 411, the quality of the power received from the power supply 440. The controller 406 can further determine whether the power source 495, through the power supply 440, is providing any instructions for operating the luminaire 400.

The controller 406 can provide control, communication, and/or other similar signals to the user 450, the network manager 480, the power source 495, the power supply 440, and one or more of the sensors 460. Similarly, the controller 406 can receive control, communication, and/or other similar signals from the user 450, the network manager 480, the power source 495, the power supply 440, and one or more of the sensors 460. The controller 406 can control each sensor 460 automatically (for example, based on one or more algorithms stored in the storage repository 430) and/or based on control, communication, and/or other similar signals received from another device through a communication link 405. The controller 406 may include a printed circuit board, upon which the hardware processor 420 and/or one or more discrete components of the control module 404 are positioned.

In certain example embodiments, the controller 406 can include an interface that enables the controller 406 to communicate with one or more components (e.g., power supply 440) of the luminaire 400. For example, if the power supply 440 of the luminaire 400 operates under IEC Standard 62386, then the power supply 440 can include a digital addressable lighting interface (DALI). In such a case, the controller 406 can also include a DALI to enable communication with the power supply 440 within the luminaire 400. Such an interface can operate in conjunction with, or independently of, the communication protocols 432 used to communicate between the control module 404 and the user 450, the network manager 480, the power source 495, and the sensors 460.

The controller 406 (or other components of the control module 404) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (VC), and a pulse width modulator (PWM).

In certain example embodiments, the one or more switches 431 of the control module 404 is used to select, based on a position of a switch 431, one of a number of communication modes 490 (e.g., communication mode 490-1, communication mode 490-N). As discussed below, the position of a switch 431 can also be used to select one or more of a number of CCTs output by the luminaire 400. Each switch 431 can be any of a number of types of switch, including but not limited to one or more DIP switches, one or more SIPP switches, one or more rocker switches, one or more reed switches, one or more magnetic switches, one or more rotary switches, one or more rotary dials, one or more selectors or selector switches, one or more slide switches, one or more snap switches, one or more thumbwheels, one or more toggles or toggle switches, one or more keys or keypads, one or more buttons or pushbuttons, one or more operational amplifiers, and one or more of a number of discrete components that are coupled to each other. For example, a switch 431 can be a combination of a MOSFET, a diode, a resistor, and a capacitor.

In addition to physical switches, a switch 431 can be electronic or software-based (virtual). In such a case, when a user 450, using a user system and one or more communication links 405, communicates with the controller 404 of the luminaire 400, a communication mode and/or a CCT output by the luminaire 400 can be changed without accessing the luminaire 400 to change the position of a physical switch. In such a case, an app, a website, or other software-based implementation can be used to allow a user 450 to change the position of a non-physical switch 431 of the luminaire 400, thereby changing the mode of communication of the luminaire 400 and/or changing the CCT output by the luminaire 400.

Each switch 431 is controlled by the controller 406 of the control module 404. When there are multiple switches 431, each switch 431 can be used to control (e.g., enable, disable) one or more communication modes 490 of the luminaire 400. The controller 406 can be coupled to each of the switches 431 using communication links 405 (e.g., electrical conductors, wire traces). A switch 431 can have an open position and a closed position. In other cases, a switch 431 can have three or more positions. When there are multiple switches 431, different combinations of positions of the various switches 431 can be used to select a communication mode 490 used by the luminaire 400. In some cases, one communication mode 490 (e.g., communication mode 490-1) can be enabled to communicate with one component (e.g., a user 450) of the system 498 while another communication mode 490 (e.g., communication mode 490-N) can be enabled to communicate with another component (e.g., the network manager 480) of the system 498 at the same time.

The communication module 408 of the control module 404 determines and implements a communication mode 490 (e.g., from the communication protocols 432 of the storage repository 430) that is used when the controller 406 communicates with (e.g., sends signals to, receives signals from) the user 450, the network manager 480, the power source 495, and/or one or more of the sensors 460. In some cases, the communication module 408 accesses the sensor data 434 to determine which communication protocol is used for a communication mode 490 to communicate with the sensor 460 associated with the sensor data 434. In addition, the communication module 408 can interpret the communication protocol of a communication received by the control module 404 so that the controller 406 can interpret the communication.

The communication module 408, using a communication mode 490, can send and receive data between the network manager 480, the power source 495, and/or the users 450 and the control module 404. The communication module 408, based on an enabled communication mode 490, can send and/or receive data in a given format that follows a particular communication protocol 432. The controller 406 can interpret the data packet received from the communication module 408 using the communication protocol 432 information stored in the storage repository 430. The controller 406 can also facilitate the data transfer between one or more sensors 460 and the network manager 480, the power source 495, and/or a user 450 by converting the data into a format understood by the communication module 408.

Each communication mode 490 can be associated with a selectable mode of communication or a communication protocol. For example, communication mode 490-1 can be associated with Zigbee. As another example, communication mode 490-N can be associated with Bluetooth (e.g., traditional Bluetooth, BLE). The communication module 408 can send data (e.g., communication protocols 432, operational protocols 433, sensor data 434, operational information, error codes, threshold values, algorithms) directly to and/or retrieve data directly from the storage repository 430. Alternatively, the controller 406 can facilitate the transfer of data between the communication module 408 and the storage repository 430.

A communication mode 490 can be particular with respect to one or more components of the system 498. For example, a particular communication mode 490 can be with respect to communications with a user 450, but not with respect to the network manager 480. In this way, when a switch 431 is used to select a particular communication mode 490, such a selection can affect communications with one or more particular components of the system 498. Alternatively, when a switch 431 is used to select a particular communication mode 490, such a selection can affect communications with all components of the system 498.

The communication module 408 can also provide encryption to data that is sent by the control module 404 and decryption to data that is received by the control module 404. The communication module 408 can also provide one or more of a number of other services with respect to data sent from and received by the control module 404. Such services can include, but are not limited to, data packet routing information and procedures to follow in the event of data interruption.

The timer 410 of the control module 404 can track clock time, intervals of time, an amount of time, and/or any other measure of time. The timer 410 can also count the number of occurrences of an event, whether with or without respect to time. Alternatively, the controller 406 can perform the counting function. The timer 410 is able to track multiple time measurements concurrently. The timer 410 can track time periods based on an instruction received from the controller 406, based on an instruction received from the user 450, based on an instruction programmed in the software for the control module 404, based on some other condition or from some other component, or from any combination thereof.

The timer 410 can be configured to track time when there is no power delivered to the control module 404 (e.g., the power module 412 malfunctions) using, for example, a super capacitor or a battery backup. In such a case, when there is a resumption of power delivery to the control module 404, the timer 410 can communicate any aspect of time to the control module 404. In such a case, the timer 410 can include one or more of a number of components (e.g., a super capacitor, an integrated circuit) to perform these functions.

The energy metering module 411 of the control module 404 measures one or more components of power (e.g., current, voltage, resistance, VARs, watts) at one or more points (e.g., output of the power supply 440) associated with the luminaire 400. The energy metering module 411 can include any of a number of measuring devices and related devices, including but not limited to a voltmeter, an ammeter, a power meter, an ohmmeter, a current transformer, a potential transformer, and electrical wiring. The energy metering module 411 can measure a component of power continuously, periodically, based on the occurrence of an event, based on a command received from the controller 406, and/or based on some other factor.

The power module 412 of the control module 404 provides power to one or more other components (e.g., timer 410, controller 406) of the control module 404. In addition, in certain example embodiments, the power module 412 can provide power to one or more of the sensors 460 of the luminaire 400. The power module 412 can include one or more of a number of single or multiple discrete components (e.g., transistor, diode, resistor), and/or a microprocessor. The power module 412 may include a printed circuit board, upon which the microprocessor and/or one or more discrete components are positioned. In some cases, the power module 412 can include one or more components that allow the power module 412 to measure one or more elements of power (e.g., voltage, current) that is delivered to and/or sent from the power module 412.

The power module 412 can include one or more components (e.g., a transformer, a diode bridge, an inverter, a converter) that receives power (e.g., AC mains) from the power supply 440 and/or some other source of power (e.g., a battery, a source external to the luminaire 400). The power module 412 can use this power to generate power of a type (e.g., alternating current, direct current) and level (e.g., 12V, 24V, 120V) that can be used by the other components of the control module 404 and the light sources 442. In addition, or in the alternative, the power module 412 can be a source of power in itself to provide signals to the other components of the control module 404 and/or the light sources 442. For example, the power module 412 can be a battery or other form of energy storage device. As another example, the power module 412 can be a localized photovoltaic solar power system.

In certain example embodiments, the power module 412 of the control module 404 can also provide power and/or control signals, directly or indirectly, to one or more of the sensors 460. In such a case, the controller 406 can direct the power generated by the power module 412 to the sensors 460 and/or the light sources 442 of the luminaire 400. In this way, power can be conserved by sending power to the sensors 460 and/or the light sources 442 of the luminaire 400 when those devices need power, as determined by the controller 406.

The hardware processor 420 of the control module 404 executes software, algorithms, and firmware in accordance with one or more example embodiments. Specifically, the hardware processor 420 can execute software on the controller 406 or any other portion of the control module 404, as well as software used by the user 450, the network manager 480, the power source 495, the power supply 440, and/or one or more of the sensors 460. The hardware processor 420 can be an integrated circuit, a central processing unit, a multi-core processing chip, SoC, a multi-chip module including multiple multi-core processing chips, or other hardware processor in one or more example embodiments. The hardware processor 420 is known by other names, including but not limited to a computer processor, a microprocessor, and a multi-core processor.

In one or more example embodiments, the hardware processor 420 executes software instructions stored in memory 422. The memory 422 includes one or more cache memories, main memory, and/or any other suitable type of memory. The memory 422 can include volatile and/or non-volatile memory. The memory 422 is discretely located within the control module 404 relative to the hardware processor 420 according to some example embodiments. In certain configurations, the memory 422 can be integrated with the hardware processor 420.

In certain example embodiments, the control module 404 does not include a hardware processor 420. In such a case, the control module 404 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the control module 404 (or portions thereof) to be programmable and function according to certain logic rules and thresholds without the use of a hardware processor. Alternatively, FPGAs, IGBTs, ICs, and/or similar devices can be used in conjunction with one or more hardware processors 420.

The transceiver 424 of the control module 404 can send and/or receive control and/or communication signals. Specifically, the transceiver 424 can be used to transfer data between the control module 404 and the user 450, the network manager 480, the power source 495, the power supply 440, and/or the sensors 460. The transceiver 424 can use wired and/or wireless technology. The transceiver 424 can be configured in such a way that the control and/or communication signals sent and/or received by the transceiver 424 can be received and/or sent by another transceiver that is part of the user 450, the network manager 480, the power source 495, the power supply 440, and/or the sensors 460. The transceiver 424 can use any of a number of signal types, including but not limited to radio frequency signals and visible light signals.

When the transceiver 424 uses wireless technology, any type of wireless technology can be used by the transceiver 424 in sending and receiving signals. Such wireless technology can include, but is not limited to, Wi-Fi, visible light communication, cellular networking, BLE, Zigbee, and Bluetooth. The transceiver 424 can use one or more of any number of suitable communication protocols (e.g., ISA100, HART) when sending and/or receiving signals. Such communication protocols can be stored in the communication protocols 432 of the storage repository 430. Further, any transceiver information for the user 450, the network manager 480, the power source 495, the power supply 440, and/or the sensors 460 can be part of the communication protocols 432 (or other areas) of the storage repository 430.

Optionally, in one or more example embodiments, the security module 428 secures interactions between the control module 404, the user 450, the network manager 480, the power source 495, the power supply 440, and/or the sensors 460. More specifically, the security module 428 authenticates communication from software based on security keys verifying the identity of the source of the communication. For example, user software may be associated with a security key enabling the software of the user 450 to interact with the control module 404. Further, the security module 428 can restrict receipt of information, requests for information, and/or access to information in some example embodiments.

As mentioned above, aside from the control module 404 and its components, the luminaire 400 can include one or more sensors 460, a power supply 440, and one or more light sources 442. The sensors 460 are described above. The light sources 442 of the luminaire 400 are devices and/or components typically found in a light fixture to allow the luminaire 400 to operate. The light sources 442 emit light using power provided by the power supply 440. The luminaire 400 can have one or more of any number and/or type (e.g., light-emitting diode, incandescent, fluorescent, halogen) of light sources 442. A light source 442 can vary in the amount and/or color of light that it emits. When a luminaire 400 uses LED light sources 442, those LED light sources 442 can include any type of LED technology, including, but not limited to, chip on board (COB) and discrete die.

The power supply 440 of the luminaire 400 receives power (also called primary power or AC mains power) from the power source 495. The power supply 440 uses the power it receives to generate and provide power (also called final power herein) to the control module 404. The power supply 440 can be called by any of a number of other names, including but not limited to a driver, a LED driver, and a ballast. The power supply 440 can include one or more of a number of single or multiple discrete components (e.g., transistor, diode, resistor), and/or a microprocessor. The power supply 440 may include a printed circuit board, upon which the microprocessor and/or one or more discrete components are positioned.

In some cases, the power supply 440 can include one or more components (e.g., a transformer, a diode bridge, an inverter, a converter) that receives power from the power source 495 and generates power of a type (e.g., alternating current, direct current) and level (e.g., 12V, 24V, 120V) that can be used by the control module 404. In addition, or in the alternative, the power supply 440 can be a source of power in itself. For example, the power supply 440 can or include be a battery, a localized photovoltaic solar power system, or some other source of independent power.

The switch 431, which can be part of the control module 406 or separate from but in communication with the control module 406, can be used to select one or more of a number of variables that affect the operation of the luminaire 400. For example, the switch 431 can be used to select one or more of a number of communication modes 490. The switch 431 can be any of a number of types of switches, including but not limited to one or more DIP switches, one or more SIPP switches, one or more rocker switches, one or more reed switches, one or more magnetic switches, one or more rotary switches, one or more rotary dials, one or more selectors or selector switches, one or more slide switches, one or more snap switches, one or more thumbwheels, one or more toggles or toggle switches, one or more keys or keypads, and one or more buttons or pushbuttons.

The luminaire 400 can also include one or more of a number of other components. Examples of such other components can include, but are not limited to, a heat sink, an electrical conductor or electrical cable, a housing, a terminal block, a lens, a diffuser, a reflector, an air moving device, a baffle, and a circuit board. As stated above, the luminaire 400 can be placed in any of a number of environments. In such a case, the housing of the luminaire 400 can be configured to comply with applicable standards for any of a number of environments. For example, the luminaire 400 can be rated as a Division 1 or a Division 2 enclosure under NEC standards. Similarly, the control module 404, any of the sensors 460, or other devices communicably coupled to the luminaire 400 can be configured to comply with applicable standards for any of a number of environments. For example, a sensor 460 can be rated as a Division 1 or a Division 2 enclosure under NEC standards.

Figure 5:
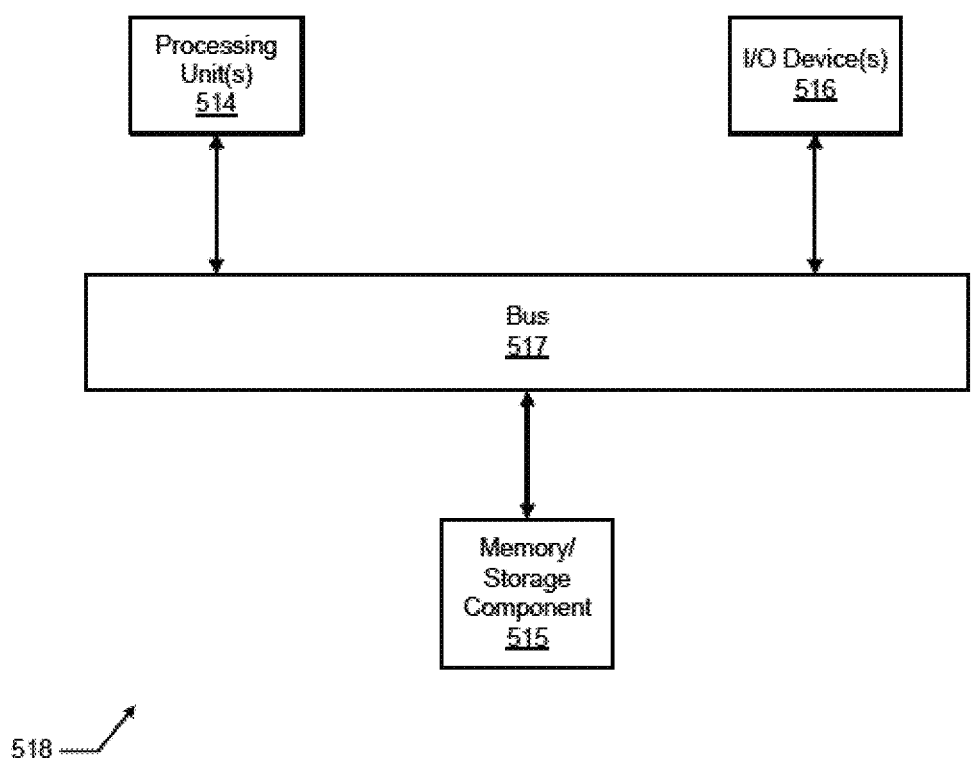
FIG. 5 shows a computing device in accordance with certain example embodiments.

FIG. 5 illustrates one embodiment of a computing device 518 that implements one or more of the various techniques described herein, and which is representative, in whole or in part, of the elements described herein pursuant to certain example embodiments. For example, the control module 404 of FIGS. 4A and 4B (including components thereof, such as the control engine 406, the hardware processor 420, the storage repository 430, and the transceiver 424) can be considered a computing device 518. Computing device 518 is one example of a computing device and is not intended to suggest any limitation as to scope of use or functionality of the computing device and/or its possible architectures. Neither should computing device 518 be interpreted as having any dependency or requirement relating to any one or combination of components illustrated in the example computing device 518.

Computing device 518 includes one or more processors or processing units 514, one or more memory/storage components 515, one or more input/output (I/O) devices 516, and a bus 517 that allows the various components and devices to communicate with one another. Bus 517 represents one or more of any of several types of bus structures, including a memory bus or memory controller, a peripheral bus, an accelerated graphics port, and a processor or local bus using any of a variety of bus architectures. Bus 517 includes wired and/or wireless buses.

Memory/storage component 515 represents one or more computer storage media. Memory/storage component 515 includes volatile media (such as random access memory (RAM)) and/or nonvolatile media (such as read only memory (ROM), flash memory, optical disks, magnetic disks, and so forth). Memory/storage component 515 includes fixed media (e.g., RAM, ROM, a fixed hard drive, etc.) as well as removable media (e.g., a Flash memory drive, a removable hard drive, an optical disk, and so forth).

One or more I/O devices 516 allow a customer, utility, or other user to enter commands and information to computing device 518, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 518 is connected to a network (not shown) (e.g., a LAN, a WAN such as the Internet, the cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 518 includes at least the minimal processing, input, and/or output means necessary to practice one or more embodiments.

Further, those skilled in the art will appreciate that one or more elements of the aforementioned computer device 518 is located at a remote location and connected to the other elements over a network in certain example embodiments. Further, one or more embodiments is implemented on a distributed system having one or more nodes, where each portion of the implementation (e.g., controller 406) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 6A:
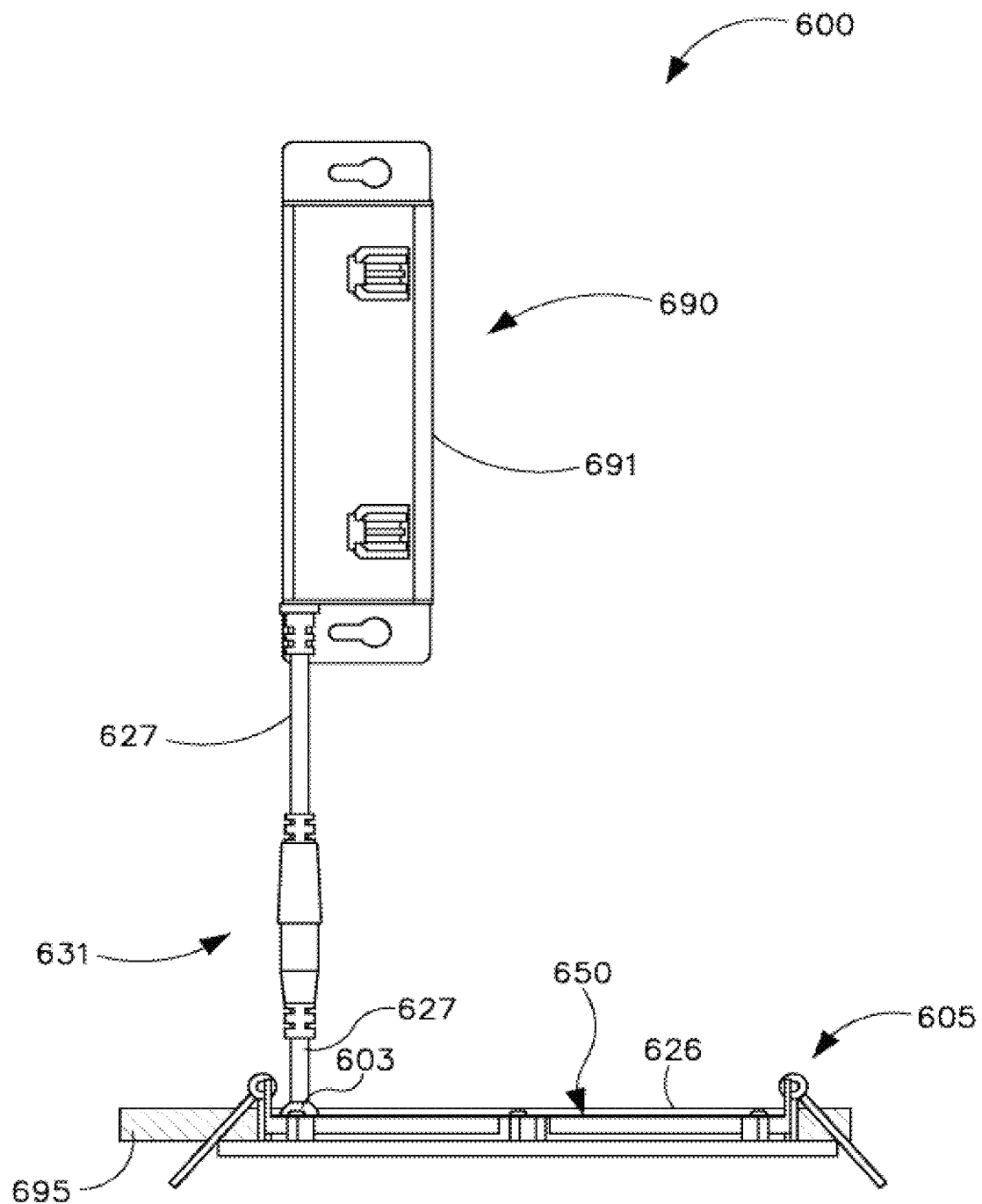
FIGS. 6A and 6B show another luminaire that includes a switch in accordance with certain example embodiments.
Figure 6B:
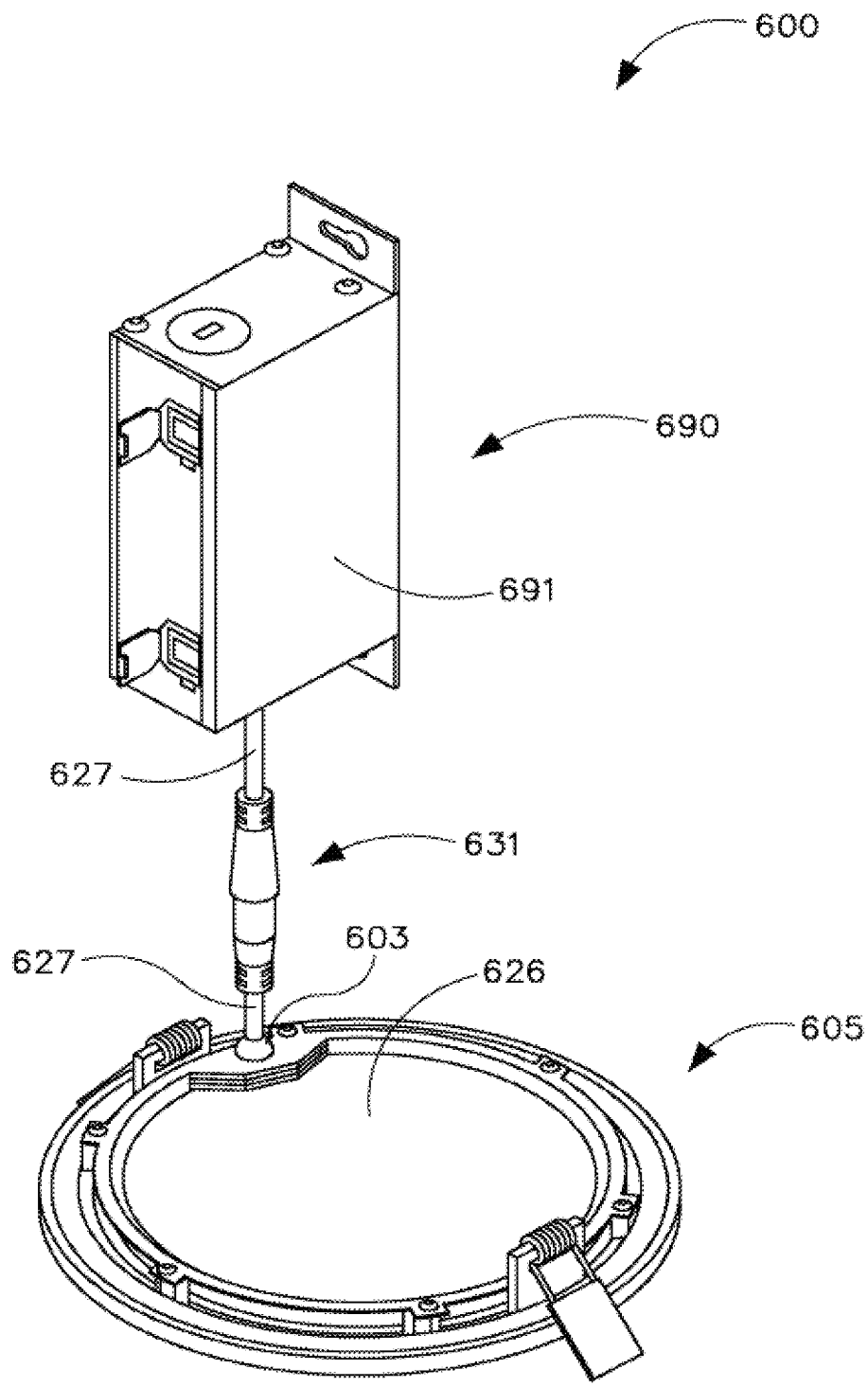

FIGS. 6A and 6B show another luminaire 600 that includes a switch 631 in accordance with certain example embodiments. Specifically, FIG. 6A shows a cross-sectional side view of the luminaire 600, and FIG. 6B shows a top-side-front perspective view of the luminaire 600. Referring to FIGS. 1A through 6B, the luminaire 600 of FIGS. 6A and 6B is substantially the same as the luminaires discussed above, except as described below.

For example, the luminaire 600 of FIGS. 6A and 6B in this case includes a housing 605 and a remotely located junction box 690. In this case, the luminaire 600 includes a surface-mounted light fixture, and so the housing 605 is low profile. An electrical cable 627 extends through a wiring aperture 603 in the cover 626. The electrical cable 627 can include one or more electrical conductors to transfer power, control, communication, data, and/or any other type of electrical signals. One end of the electrical cable 627 is connected to one or more components (e.g., light sources 650) disposed on and/or within the housing 605 of the luminaire 600.

In this case, the housing 605 is installed in a ceiling 695. The junction box 690 is located behind the ceiling and includes one or more walls 691 to enclose one or more electrical components (e.g., a driver). An opposing end of the electrical cable 627 is coupled to one or more of those electrical components disposed in the junction box 690. In this way, the electrical cable 627 electrically couples one or more electrical components in the junction box 690 with one or more electrical components in or on the housing 605. When the housing 605 is mounted in its installed location (in this case, the ceiling 695), the entire electrical cable 627 (and so also the switch 631) is behind the ceiling 695 and is inaccessible. Similarly, when the housing 605 is mounted in its installed location (e.g., the ceiling 695), the junction box 960 can be inaccessible. When the housing 605 is removed from its installed location, the junction box 690 and the electrical cable 627 (and so also the switch 631) can be accessible.

With the embodiments discussed previously, the example switch is located on the housing of the luminaire or within the housing of the luminaire. Here, the switch 631 is located outside of the housing 605 of the luminaire 600. Specifically, in this case, the switch 631 is in-line with the electrical cable 627. The switch 631 can be substantially the same as the example switches discussed above. For instance, the switch 631 can have one or more coupling features (e.g., terminal points) that are used to couple to one or more electrical conductors of one or more electrical cables 627. As another example, the switch 631 can have an actuator having multiple positions.

As yet another example, the switch 631 can be or include an inline pin switch, multiple DIP switches, one or more single in-line pin packages (SIP or SIPP), one or more rocker switches, one or more reed switches, one or more magnetic switches, one or more rotary switches, one or more rotary dials, one or more selectors or selector switches, one or more slide switches, one or more snap switches, one or more thumbwheels, one or more toggles or toggle switches, one or more keys or keypads, or one or more buttons or pushbuttons.

The switch 631, like any other switch described herein, can have a range of selections that are either continuous or discrete. As with the other switches described above, the switch 631 is used to select the communication mode (e.g., communication mode 490) of the luminaire 600, and each selection (position) of the switch 631 corresponds to a communication mode of multiple communication modes. When the switch 631 is in-line with the electrical cable 627, as in this example, the switch 631 can be integrated with the electrical cable 627. Alternatively, there can be two electrical cables 627, where one electrical cable 627 is coupled to the one or more components inside the junction box 960 and one side of the switch 631, and the other electrical cable 627 is coupled to the one or more components inside or on the housing 605 and the other side of the switch 631. When the switch 631 is accessible (e.g., when the housing 605 is removed from its mounting location), the switch 631 can be replaced (e.g., without the use of tools) by a user.

Figure 7:
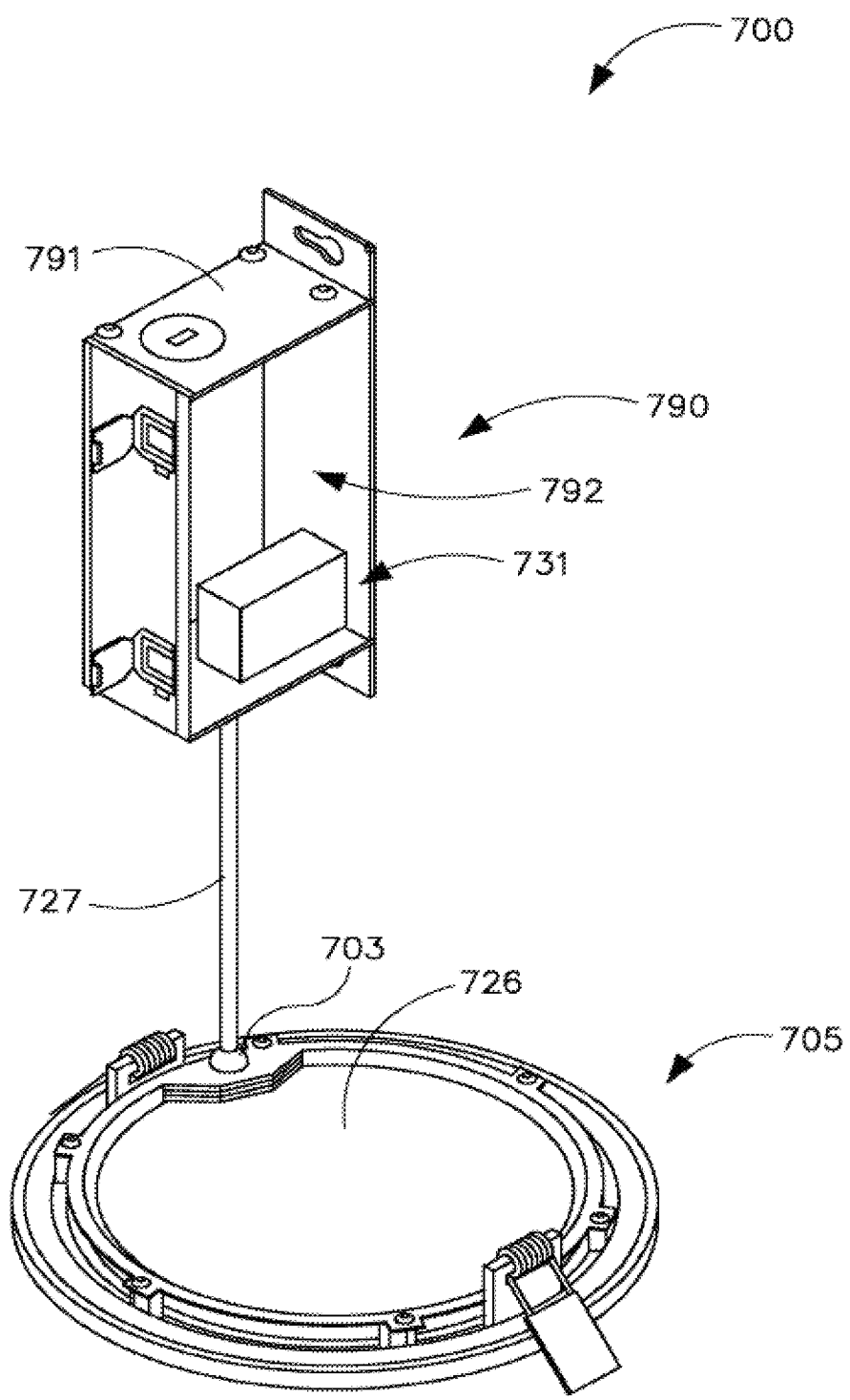
FIG. 7 shows yet another luminaire that includes a switch in accordance with certain example embodiments.

FIG. 7 shows yet another luminaire 700 that includes a switch 731 in accordance with certain example embodiments. Referring to FIGS. 1A through 7, the luminaire 700 of FIG. 7 is substantially the same as the luminaire 600 of FIGS. 6A and 6B, except that the switch 731 of the luminaire 700 of FIG. 7 is in a different location separate from the housing 705.

For example, the luminaire 700 of FIG. 7 in this case includes a housing 705 and a remotely located junction box 790. In this case, the luminaire 700 includes a surface-mounted light fixture, and so the housing 705 is low profile. The cover 726 of the housing 705 is shown in FIG. 7. An electrical cable 727 extends through a wiring aperture 703 in the cover 726. The electrical cable 727 can include one or more electrical conductors to transfer power, control, communication, data, and/or any other type of electrical signals. One end of the electrical cable 727 is connected to one or more components (e.g., light sources) disposed on and/or within the housing 705 of the luminaire 700. When the housing 705 is mounted in its installed location (e.g., a ceiling), the entire electrical cable 727 can be inaccessible. When the housing 705 is removed from its installed location, the electrical cable 727 can be accessible.

The junction box 790 includes one or more walls 791 to enclose one or more electrical components (e.g., a power supply (e.g., power supply 440), a switch 731). In this case, one of the walls of the junction box 790 is removed to show the switch 731 disposed within the cavity 792 formed by the walls 791 of the junction box 790. An opposing end of the electrical cable 727 is coupled to one or more of those electrical components disposed in the junction box 790. In this way, the electrical cable 727 electrically couples one or more electrical components in the junction box 790 with one or more electrical components in or on the housing 705. In this case, the switch 731 is disposed within the junction box 790. When the housing 705 is mounted in its installed location (e.g., a ceiling), the junction box 790 (and so also the switch 731) can be inaccessible. When the housing 705 is removed from its installed location, the junction box 790 (and so also the switch 731) can be accessible.

The switch 731 of FIG. 7 can be substantially the same as the switch 731 described above with respect to FIGS. 6A and 6B. For example, the switch 731 can have a range of selections that are either continuous or discrete. As with the other switches described above, the switch 731 is used to select the communication mode of the luminaire 700, and each selection (position) of the switch 731 corresponds to a communication mode among multiple communication modes. As an alternative to the embodiment shown in FIG. 7, rather than being disposed within the cavity 792 of the junction box 790, the switch 731 can be disposed on a wall 791 of the junction box 790 or remotely from the junction box 790 as well as remotely from the housing 705 of the luminaire 700.

Figure 8:
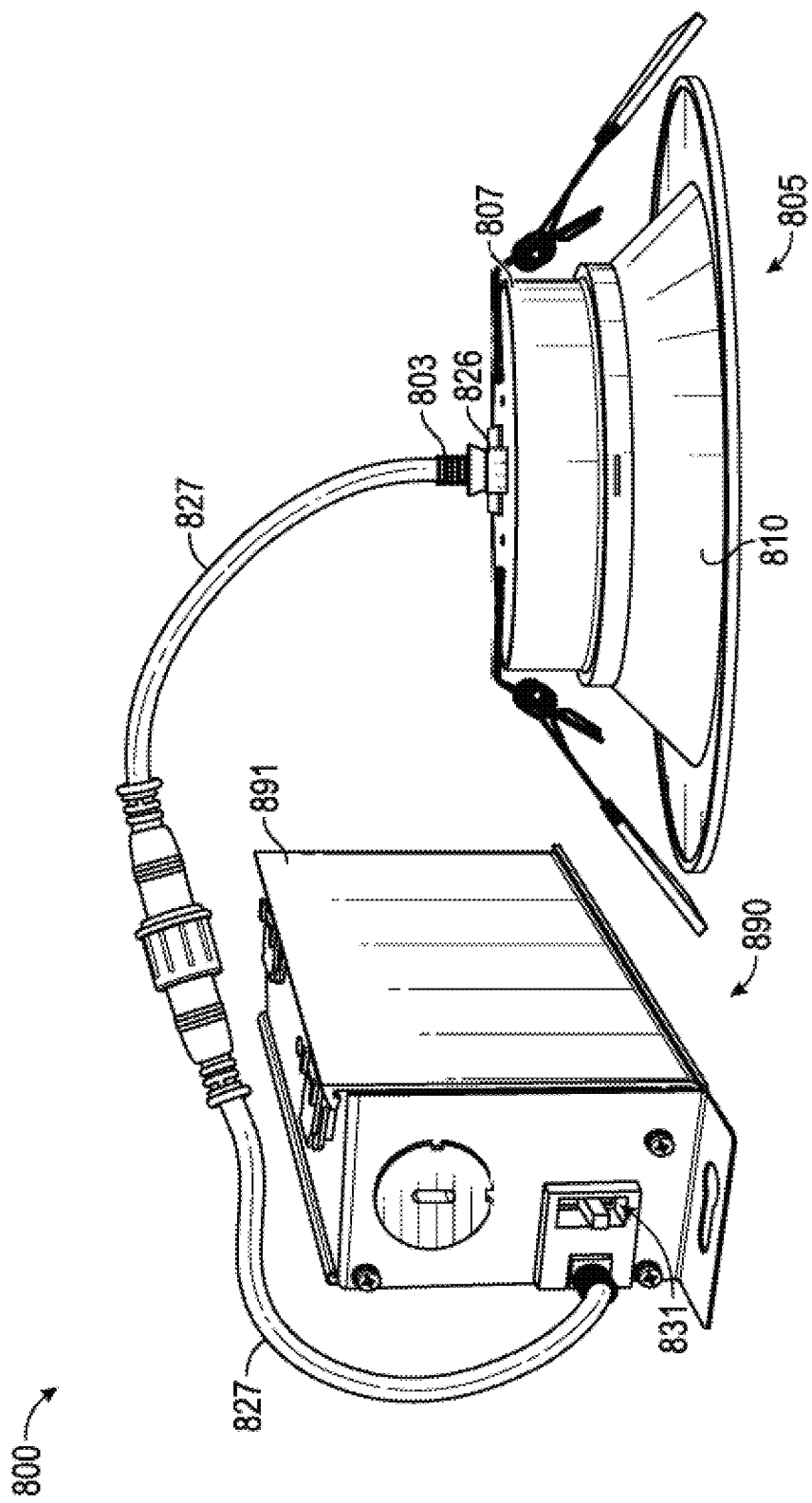
FIG. 8 shows still another luminaire that includes a switch in accordance with certain example embodiments.

FIG. 8 shows still another luminaire 800 that includes a switch 831 in accordance with certain example embodiments. Referring to FIGS. 1A through 8, the luminaire 800 of FIG. 8 is similar to the luminaire 600 of FIGS. 6A and 6B. For example, the luminaire 800 of FIG. 8 includes a housing 805 and a remotely located junction box 890. In this case, the luminaire 800 includes a surface-mounted light fixture, and so the housing 805 is relatively low profile. An electrical cable 827 extends through a wiring aperture 803 in the cover 826 of the housing 805. The electrical cable 827 can include one or more electrical conductors to transfer power, control, communication, data, and/or any other type of electrical signals. One end of the electrical cable 827 is connected to one or more components (e.g., light sources) disposed on and/or within the housing 805 of the luminaire 800.

An opposing end of the electrical cable 827 is coupled to one or more of those electrical components disposed in the junction box 890. In this way, the electrical cable 827 electrically couples one or more electrical components in the junction box 890 with one or more electrical components in or on the housing 805. When the housing 805 is mounted in its installed location (e.g., a ceiling), the entire electrical cable 827 and the junction box 890 (and so also the switch 831) are hidden behind the ceiling (or other mounting structure) and are inaccessible. When the housing 805 is removed from its installed location, the junction box 890 (and so also the switch 831) and the electrical cable 827 can be accessible.

In this case, rather than being disposed inside the junction box 890, the switch 831 is a physical switch that is disposed in an aperture in one of the walls 891 of the junction box 890. In this way, the position of the switch 831 can be accessed and changed by a user after removing the housing 805 from the mounting structure and without having to open the junction box 980. The switch 831 can be substantially the same as the example switches discussed above. For instance, the switch 831 of FIG. 8 can have one or more coupling features (e.g., terminal points) that are used to couple to one or more electrical conductors of one or more electrical cables 827. As another example, the switch 831 can have an actuator having multiple positions.

Figure 9:
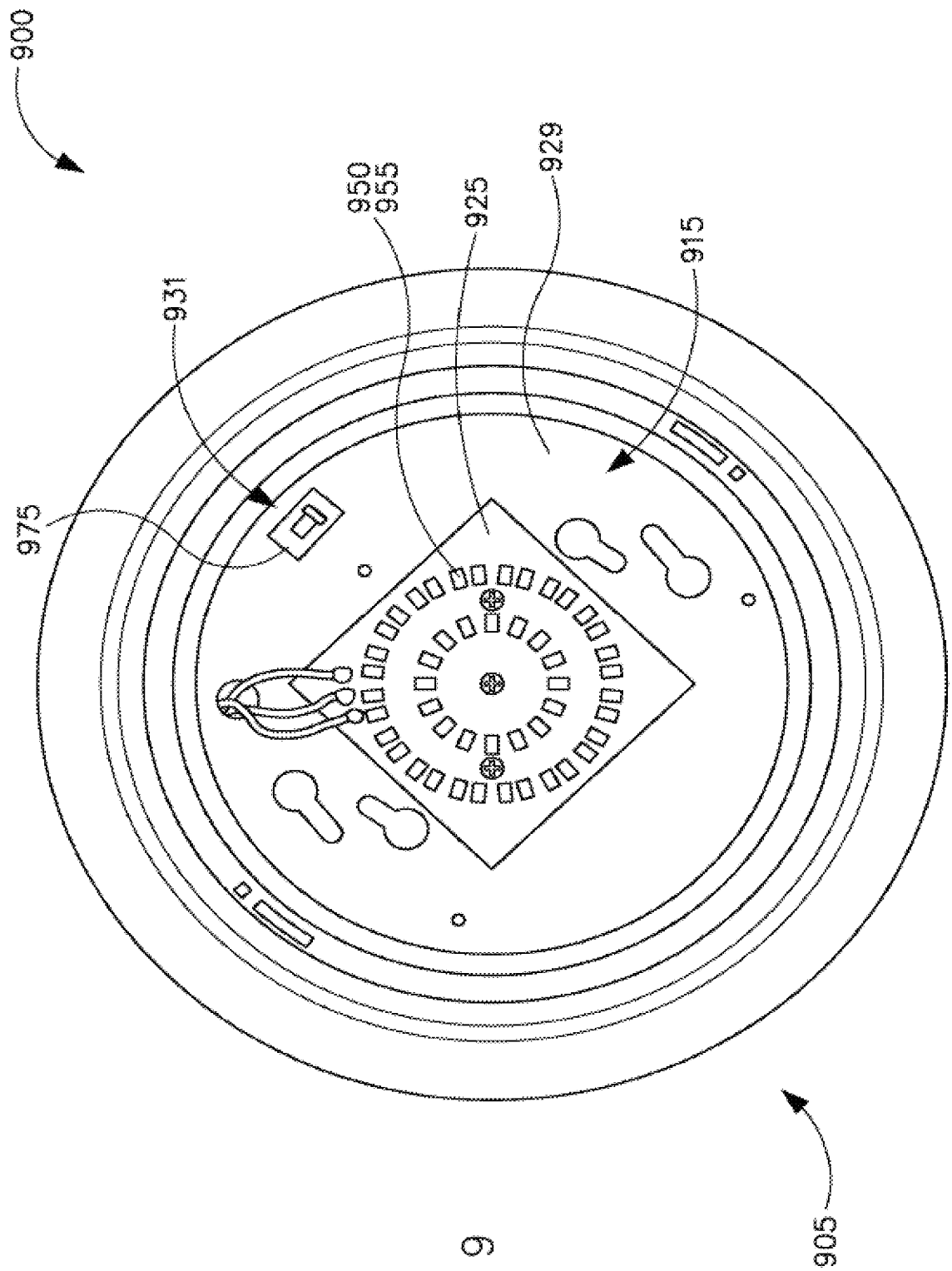
FIG. 9 shows yet another luminaire that includes a switch in accordance with certain example embodiments.

FIG. 9 shows yet another luminaire 900 that includes a switch 931 in accordance with certain example embodiments. Specifically, FIG. 9 shows a bottom view of the luminaire 900. Referring to FIGS. 1A-9, the luminaire 900 shown in FIG. 9 is substantially similar to the luminaire 100 shown in FIG. 1E above, except for the location of the switch 931, as described below. For example, the luminaire 900 of FIG. 9 shows the lens and reflector removed from the light-emitting aperture 915 of the luminaire 900, leaving the mounting plate 929 exposed. The light emitting diodes 950, 955 are mounted on a substrate 925 (e.g., a circuit board), and the substrate 925 is mounted on the mounting plate 929.

The mounting plate 929 of the luminaire 900 of FIG. 9 also has an aperture 975 (similar to aperture 275 of FIG. 2A above) that traverses therethrough. Disposed within the aperture 975 is a switch 931, which is accessible to a user (e.g., user 450) by removing the lens (and optional reflector) of the luminaire 900 without having to completely remove the luminaire 900 from its mounted position (e.g., without having to remove the luminaire from a ceiling). In other words, the switch 931 is located on a bottom surface (or room facing surface) of the mounting plate 929 so that it can be easily accessed by a person in the room without removing the luminaire 900 from the ceiling. The switch 931 in this case is a dipole linear switch, but the switch 931 can have any of a number of other configurations and/or positions, as described above.

According to certain example embodiments, changing the position of the switch 931 can change a mode of communication by which the luminaire 900 of FIG. 9 communicates. In alternative embodiments, changing the position of the switch 931 (as well as any other switch described herein) can change the CCT of the light emitted by the light emitting diodes 950, 955.

For example, a group of the light emitting diodes 950, 955 of the luminaire 900 can emit a CCT of 3000K, while another group of light emitting diodes 950, 955 can emit a CCT of 4000K. When only the group of light emitting diodes 950, 955 that emit a CCT of 3000K is selected (on), the luminaire 900 delivers 3000K illumination. When only the group of light emitting diodes 950, 955 that emit a CCT of 4000K is selected (on), the luminaire delivers 4000K illumination. When the 3000K group of light emitting diodes 950, 955 and the 4000K group of light emitting diodes 950, 955 are both on, the luminaire 900 can deliver 3500K illumination.

If the 4000K group of light emitting diodes 950, 955 is concurrently operated at a low lumen output and the 3000K group of light emitting diodes 950, 955 is operated at a high lumen output, the luminaire 900 can deliver illumination of another selected color temperature, for example 3100K. In some example embodiments, the switch 931 can be used to adjust lumen output to maintain constant delivered lumens across multiple color temperatures or to suite suit application requirements.

Example embodiments allow for user selection of one or more of a number of communication modes (e.g., Zigbee, Bluetooth). In other example embodiments allow for user selection of one or more of a number of CCTs emitted by the light emitting diodes of the luminaire. The selection in either case can be made by the adjustment of one or more switches by a user. A switch can be adjusted manually. A switch can be any type of switch. A switch can be located within, on, or remotely from a luminaire. A switch can be accessible when the luminaire is installed or only prior to installation. Example embodiments can be used to make the communication mode and/or CCT output of a luminaire more flexible, which can save costs, reduce inventory requirements, and simplify product offerings by combining multiple and selectable communication modes and/or CCT output into a single luminaire. Luminaires that use example embodiments comply with any of a number of applicable codes and/or standards (e.g., UL standards). Using example embodiments described herein can improve safety, maintenance, costs, customer satisfaction, ease of use, and operating efficiency.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A luminaire comprising:
   a first communication mode that is configured to communicate with a first component of an interconnected system that includes the luminaire;
   a second communication mode that is configured to communicate with a second component of the interconnected system; and
   a switch coupled to the first communication mode and the second communication mode, wherein the switch has a first position and a second position, wherein the switch, when in the first position, enables the first communication mode, and wherein the switch, when in the second position, enables the second communication mode.

2. The luminaire of claim 1, wherein the first component comprises at least one of a group consisting of a user, a sensor, at least one light source, a power supply, an antenna, and a network manager.

3. The luminaire of claim 1, wherein the switch is a dual inline switch.

4. The luminaire of claim 1, wherein the switch is disposed within a housing of the luminaire.

5. The luminaire of claim 1, wherein the switch is disposed on a housing of the luminaire.

6. The luminaire of claim 5, wherein the switch is removably coupled to the housing.

7. The luminaire of claim 1, wherein the first communication mode uses Zigbee.

8. The luminaire of claim 1, wherein the second communication mode uses Bluetooth.

9. The luminaire of claim 1, further comprising:
an antenna coupled to the first communication mode and the second communication mode, wherein the antenna is used to transmit wireless signals with the external system.

10. The luminaire of claim 1, wherein the switch is coupled to an electrical connector during installation of the luminaire.

11. The luminaire of claim 1, wherein the switch is inaccessible when the luminaire is installed.

12. The luminaire of claim 1, wherein the switch comprises an actuator, wherein the actuator of the switch is disposed outside a cavity formed by a housing, and wherein a remainder of the switch is disposed within the cavity formed by the housing.

13. The luminaire of claim 1, wherein the switch is software-based.

14. The luminaire of claim 13, wherein the switch is part of a controller of the luminaire.

15. The luminaire of claim 1, further comprising:
a housing; and
a lens removably coupled to the housing,
wherein the switch is inaccessible when the lens is coupled to the housing, and
wherein the switch is accessible when the lens is decoupled from the housing.

16. The luminaire of claim 1, wherein the switch is disposed remotely from a housing of the luminaire.

17. The luminaire of claim 16, wherein the switch is disposed on a junction box comprising a power supply of the luminaire.

18. A switch for controlling a communication protocol of a luminaire, the switch comprising:
a first position; and
a second position,
wherein the first position corresponds to a first communication mode that uses a first communication protocol for communicating with a first component of an interconnected system that includes the luminaire, and
wherein the second position corresponds to a second communication mode that uses a second communication protocol for communicating with a second component of the interconnected system.

19. The switch of claim 18, further comprising:
an actuator that moves between the first position and the second position.

20. A luminaire comprising:
a first sensor that measures a first parameter;
a second sensor that measures the first parameter;
a control module coupled to the first sensor and the second sensor; and
a switch,
wherein the switch has a first position and a second position, wherein the switch, when in the first position, enables a first communication mode for the control module to communicate with the first sensor, and wherein the switch, when in the second position, enables a second communication mode for the control module to communicate with the second sensor.

* * * * *